(12) United States Patent
Peters

(10) Patent No.: US 8,703,848 B1
(45) Date of Patent: Apr. 22, 2014

(54) BLENDS OF MICRONIZED POLYPHENYLENE ETHER AND THERMOPLASTIC POLYURETHANES BLEND

(71) Applicant: Sabic Innovative Plastics, Pittsfield, MA (US)

(72) Inventor: Edward Norman Peters, Lenox, MA (US)

(73) Assignee: SABIC Innovative Plastics, Pittsfield, MA (US)

( * ) Notice: Subject to any disclaimer, the term of this patent is extended or adjusted under 35 U.S.C. 154(b) by 0 days.

(21) Appl. No.: 13/647,829

(22) Filed: Oct. 9, 2012

(51) Int. Cl.
*C08K 5/34* (2006.01)
*C08G 64/00* (2006.01)

(52) U.S. Cl.
USPC ............... 524/100; 525/452; 528/44; 528/61; 528/85; 528/332

(58) Field of Classification Search
USPC .................. 528/44, 61, 85, 332; 525/452
See application file for complete search history.

(56) References Cited

U.S. PATENT DOCUMENTS

| 3,383,340 | A | 5/1968 | MacCallum et al. | |
|---|---|---|---|---|
| 6,051,662 | A | 4/2000 | Tracy et al. | |
| 2001/0034418 | A1* | 10/2001 | Yeager et al. | 525/397 |
| 2001/0034430 | A1* | 10/2001 | Yeager et al. | 528/206 |

FOREIGN PATENT DOCUMENTS

GB  1330947  9/1973

OTHER PUBLICATIONS

Bucknall, Clive B., et al., Polymer, Phase separation in epoxy resins containing polyethersulphone, vol. 24, pp. 639-644 (1983).
Raghava, R. S., 28th SAMPE Symposium, Secondary Transitions and Fracture Toughness of Cured Epoxy Resins and Their Blends with Polyethersulfones, p. 367-373 (1983).
Sultan, Jacques N., et al., Applied Polymer Symposium, Miicrostructure of Two-Phase Polymers, vol. 16, pp. 127-136 (1971).
Mc Garry, F. J., et al., Epoxy-Rubber Interactions, Rubber-Toughened Plastics I, edited by C. K. Riew, and A. J. Kinloch, Advances in Chemistry Series, 233, Amer. Chem. Soc., Washington DC, Chapter 12, pp. 305-315 (1993).
Chinn, Henry, et al., Chemical Economics Handbook, CEH Marketing Research Report, Polyurethane Elastomers (2006).
Drobny, J. G., et al., Handbook of Thermoplastic Elastomers, Publishing/Plastics Design Library, Chapter 9, pp. 215-234 (2007).
Hare, G. H., Review of Polyurethanes: Formulation Variables and their Effects on Performance, Journal of Protective Coatings & Linings, vol. 17, Issue 11, pp. 34-44 (2000).
Levchik, Sergei, et al., Thermal decomposition, combustion and fire-retardancy of polyurethanes—a review of the recent literature; Polym Int 53: pp. 1585-1610 (2004).

* cited by examiner

*Primary Examiner* — Terressa Boykin
(74) *Attorney, Agent, or Firm* — Honigman Miller Schwartz and Cohn, LLP; Heidi M. Berven

(57) ABSTRACT

Disclosed herein is a blend comprising:
(a) 5 to 50 percent by weight of the micronized poly(phenylene ether), wherein the mean particle size of the poly(phenylene ether) is 9 microns or less;
(b) 50 to 95 percent by weight of a thermoplastic polyurethane;
wherein the weight percents are based on the total weight of the blend.
Also disclosed are processes for preparing such blends as well as articles derived therefrom.

17 Claims, 23 Drawing Sheets

BLENDS OF MICRONIZED POLYPHENYLENE ETHER AND THERMOPLASTIC POLYURETHANES BLEND

FIELD OF THE INVENTION

The invention relates to blends of micronized poly(phenylene ether) and thermoplastic polyurethanes, as well as their preparation and use in thermoset resins as well as articles derived therefrom.

BACKGROUND

Polyurethanes (PU) are prepared from polyols and isocyanates. *The Polyurethanes Book*, Randall, D., Lee, S., John Wiley & Sons, New York, 2003. Uhlig, K., *Discovering Polyuretanes*, Hanser Gardner: New York, 1999. The isocyanate groups react with the hydroxyl groups on the polyol to form of urethane bond. In general, the polyol can be a low molecular weight polyether or polyester. The isocyanate can be aliphatic or aromatic and in the preparation of linear PUs is typically di-functional. However, isocyanates with greater functionality are used in preparing thermoset PUs. The family of PU resins is very complex because of the enormous variation in the compositional features of the polyols and isocyanates. This variety results in a large numbers of polymer structures and performance profiles. Indeed, PUs can be rigid solids, soft and elastomeric, or have a foam (cellular) structure.

The majority of PU resins are thermoset. However, there are also important thermoplastic polyurethane resins (TPU). TPUs are elastomers that are fully thermoplastic. Like an thermoplastic elastomers, TPUs are elastomeric and melt-processable. The generally recognized useful features of TPU include high impact strength, even at low temperatures, high elongations, good abrasion resistance, excellent heat resistance, excellent resistance to non-polar solvents, fuels, oils, resistance to ozone, oxidation, and humidity, good electric properties. However, TPUs are also generally characterized by some undesirable performance characteristics, such as high moisture absorption, low strength, and high combustibility.

As a result, a need remains for TPUs that are less susceptible to moisture absorption, have increased strength while maintaining high elongations enhanced resistance to burning, as well as increased heat resistance at elevated temperature.

SUMMARY OF THE INVENTION

These and other needs are met by the present invention, which is directed to blends of micronized polyphenylene ether (PPE) and thermoplastic polyurethanes. Micronized PPE is PPE is comprised of ultrafine particles. The blends are prepared by blending micronized PPE into thermoplastic polyurethanes (TPU) at temperatures below the glass transition temperature of the PPE. The inventors discovered that blending the micronized PPE and TPU below the glass transition temperature of the PPE prevents softening and agglomeration of PPE and results is a dispersion of micronized PPE in the TPU matrix. This avoids the need to compound the PPE into TPU via melt mixing the two polymers which would be undesirable, because the required processing temperatures would be close to or above the decomposition temperature of the TPUs.

Thus, in one aspect, the invention comprises a polymer blend comprising:
(a) 5 to 50 percent by weight of ultrafine particles poly(phenylene ether), wherein the mean particle size of the poly(phenylene ether) is 9 microns or less;
(b) 50 to 95 percent by weight of a thermoplastic polyurethane;
wherein the weight percents are based on the total weight of the blend.

Thus, in another aspect, the invention comprises a polymer blend comprising:
(a) 5 to 50 percent by weight of ultrafine particles poly(phenylene ether), wherein the mean particle size of the poly(phenylene ether) is 9 microns or less;
(b) 50 to 95 percent by weight of a thermoplastic polyurethane; and
(c) 3 to 20 weight percent of a phosphorus-containing time retardant, based on the total weight of the composition.

In another aspect, the invention comprises a polymer blend comprising:
(a) 55 to 95 percent by weight of ultrafine particles poly(phenylene ether), wherein the mean particle size of the poly(phenylene ether) is 9 microns or less;
(b) 5 to 45 percent by weight of a thermoplastic polyurethane; and
(c) a phosphorus-containing flame retardant, wherein the amount of phosphorus in the flame retardant is 0.8 to 3 weight percent based on the total weight of the composition.

In another aspect, the invention is directed to processes for preparing such blends, as well as articles derived therefrom.

DETAILED DESCRIPTION OF THE INVENTION

Figure 1:
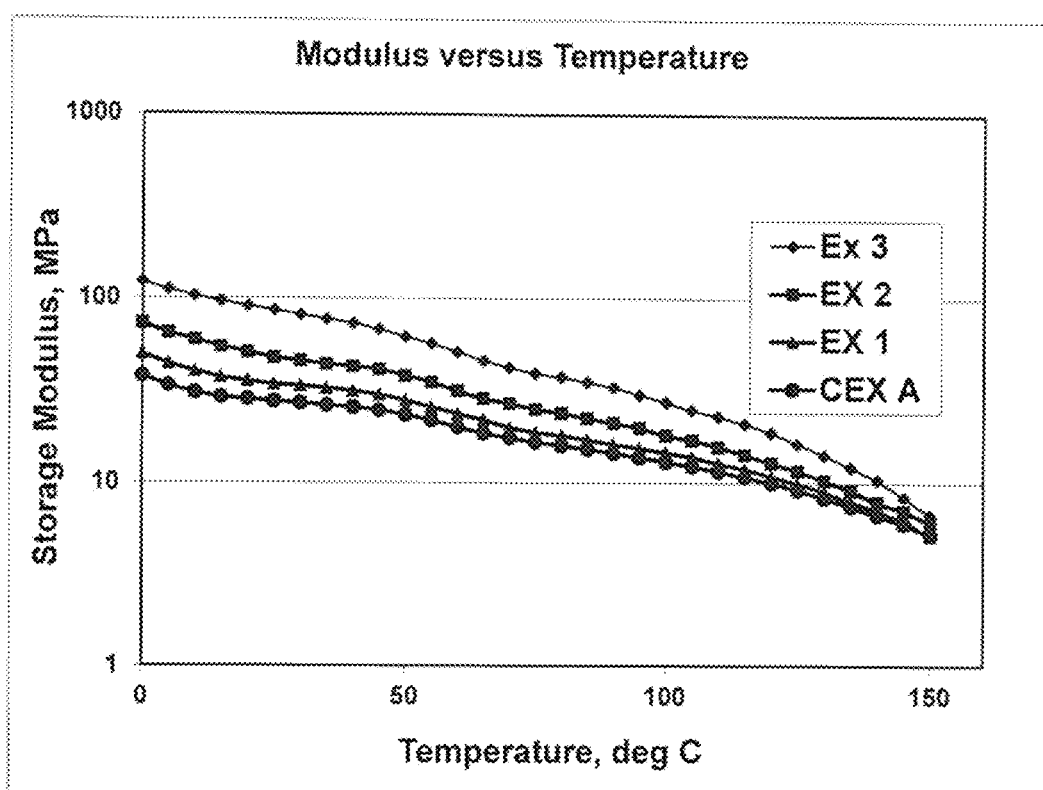
FIG. 1 depicts modulus at elevated temperature as measured by Dynamic Mechanical Analysis (DMA) for a blend of micronized PPE and Elastollan™ C85 (TPU-1).

All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein weight percentages are based on a 100 weight percent blend.

Dynamic Mechanical Analysis (DMA) refers to a technique which measures stiffness of a material as a function of temperature and is reported as modulus. DMA is also called DMTA for Dynamic Mechanical Thermal Analysis. The DMA procedure involves applying small deformation to a sample in a cyclic manner. This allows the materials to respond to stress, temperature, frequency and other values to be studied. Because the applied force is sinusoidal, the modulus can be expressed as an in-phase component, the storage modulus, and an out of phase component, the loss modulus.

Components

Poly(phenylene ether)

The blend comprises a poly(phenylene ether). In some embodiments, the poly(phenylene ether) used to form the blend comprises repeating structural units of the formula

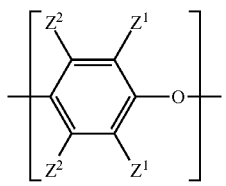

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

A used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(phenylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(phenylene ether) comprises TMDQ end groups in an amount of less than 5 weight percent, specifically less than 3 weight percent, more specifically less than 1 weight percent, based on the weight of the poly(phenylene ether). In some embodiments, the poly(phenylene ether) comprises, on average, about 0.7 to about 2 moles, specifically about 1 to about 1.5 moles, of chain-terminal hydroxyl groups per mole of poly(phenylene ether).

The poly(phenylene ether) can be in the form of a homopolymer, a copolymer, a graft copolymer, an ionomer, or a block copolymer, as well as combinations comprising at least one of the foregoing. Poly(phenylene ether) includes polyphenylene ether comprising 2,6-dimethyl-1,4-phenylene ether units optionally in combination with 2,3,6-trimethyl-1,4-phenylene ether units. In some embodiments, the poly(phenylene ether) is an unfunctionalized poly(phenylene ether). An unfunctionalized poly(phenylene ether) is a poly(phenylene ether) consisting of the polymerization product of one or more phenols. The term "unfunctionalized poly(phenylene ether)" excludes functionalized poly(phenylene ether)s such as acid-functionalized poly(phenylene ether)s and anhydride-functionalized poly(phenylene ether)s. In some embodiments, the poly(phenylene ether) comprises a poly(2,6-dimethyl-1,4-phenylene ether).

The poly(phenylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the blend comprises less than or equal to 2 weight percent, specifically less than or equal to 1 weight percent, more specifically less than or equal to 0.5 weight percent, of a poly(phenylene ether)-polysiloxane block copolymer. In some embodiments, the blend excludes poly(phenylene ether)-polysiloxane block copolymer. Poly (phenylene ether)-polysiloxane block copolymers, which comprise at least one poly(phenylene ether) block and at least one polysiloxane block, are described, for example, in U.S. Patent Application Publication No. US 2010/0139944 A1 (Guo et al.).

In some embodiments, the poly(phenylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. As used herein, the term "peak molecular weight" is defined as the most commonly occurring molecular weight in the molecular weight distribution, in statistical terms, the peak molecular weight is the mode of the molecular weight distribution. In practical terms, when the molecular weight is determined by a chromatographic method such as gel permeation chromatography, the peak molecular weight is the poly(phenylene ether) molecular weight of the highest point in a plot of molecular weight on the x-axis versus absorbance on the y-axis.

In some embodiments, the poly(phenylene ether) is essentially free of incorporated diphenoquinone residues. "Diphenoquinone residues" means the dimerized moiety that may form in the oxidative polymerization reaction giving rise to the poly(arylene ethers) contemplated for use in the present invention. As described in U.S. Pat. No. 3,306,874 (Hay), synthesis of poly(arylene ethers) by oxidative polymerization of monohydric phenols yields not only the desired poly(phenylene ether) but also a diphenoquinone side product. For example, when the monohydric phenol is 2,6-dimethylphenol, 3,3',5,5'-tetramethyldiphenoquinone (TMDQ) is generated. Typically, the diphenoquinone is "re-equilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. As used herein, "essentially free" means that fewer than 1 weight percent of poly(phenylene ether) molecules comprise the residue of a diphenoquinone as measured by nuclear magnetic resonance spectroscopy (NMR) (Mole of TMDQ×Molecular Weight of unit TMDQ)/(Mole of Polymer×Number Average Molecular Weight (Mn)). In some embodiments, fewer than 0.5 weight percent of poly(phenylene ether) molecules comprise the residue of a diphenoquinone.

For example, as shown in Scheme 1, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone.

Scheme 1

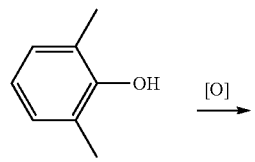

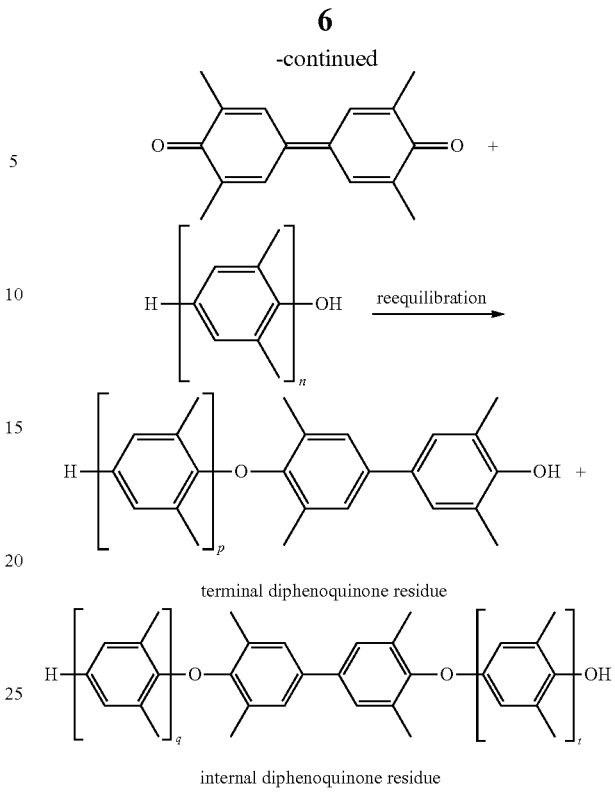

However, such re-equilibration reduces the molecular weight of the poly(phenylene ether) (e.g., p and q+r are less than n). Accordingly, when a higher molecular weight and stable molecular weight poly(phenylene ether) is desired, it may be desirable to separate the diphenoquinone from the poly(phenylene ether) rather than re-equilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble with very minimum time between end of reaction and precipitation.

For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the re-equilibration of the diphenoquinone into the poly(phenylene ether) chain can be minimized (e.g., by isolating the poly(phenylene ether) no more than 200 minutes after termination of oxidative polymerization). These approaches are described in International Patent Application Serial No. 12/255694, published as United States Published Application 2009/0211967 (Delsman, et, al.). Alternatively, diphenoquinone amounts can be achieved by removing the TMDQ formed during polymerization by filtration, specifically after stopping the oxygen feed into the polymerization reactor. In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether).

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

The poly(phenylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

In one embodiment, the poly(phenylene ether) is poly(2,6-dimethyl-1,4-phenylene ether), CAS Reg. No. 24938-67-8, having an intrinsic viscosity of 0.3 to 1.5 deciliter per gram. In a further embodiment, the poly(phenylene ether) is poly(2,6-dimethyl-1,4-phenylene ether) having an intrinsic viscosity of 0.46 deciliters per gram, measured in chloroform at 25° C. In another embodiment, the poly(phenylene ether) is poly(2,6-dimethyl-1,4-phenylene ether) having an intrinsic viscosity of 0.40 deciliters per gram, measured in chloroform at 25° C.

Poly(phenylene ether)-Polysiloxane Copolymer

In one embodiment, the blend comprises a mixture of a poly(phenylene ether) homopolymer and a poly(phenylene ether) polysiloxane copolymer. The poly(phenylene ether)-polysiloxane copolymer can be a block copolymer. The poly(phenylene ether) polysiloxane block copolymer comprises a poly(phenylene ether) block and a polysiloxane block such as described in U.S. Pat. No. 8,017,697.

The block copolymer comprising a poly(phenylene ether) block and a polysiloxane block comprises, on average, 35 to 80 siloxane repeating units, 1 to 8 weight percent siloxane repeating units and 12 to 99 weight percent arylene ether repeating units. The mixture is the product of a process comprising oxidatively copolymerizing a monomer mixture comprising a monohydric phenol and a hydroxyaryl-terminated polysiloxane. The block copolymer typically has a weight average molecular weight of at least 30,000 atomic mass units.

The poly(phenylene ether) homopolymer that is part of the mixture is the product of polymerizing a monohydric phenol alone and is a by-product of the block copolymer synthesis. When the monohydric phenol consists of a single compound (for example, 2,6-dimethylphenol, although other substituted monhydric phenols may also be used), the poly(phenylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(phenylene ether) is the product of copolymerizing the two or more distinct monohydric phenol species. Using nuclear magnetic resonance methods, it has not been possible to allocate the phenylene ether residues between poly(phenylene ether) and poly(phenylene ether)-polysiloxane block copolymer. However, the presence of poly(phenylene ether) is inferred from the presence of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

In addition to the poly(phenylene ether) homopolymer, the mixture comprises a poly(phenylene ether)-polysiloxane block copolymer. The poly(phenylene ether)-polysiloxane block copolymer comprises a poly(phenylene ether) block and a polysilaxane block. The poly(phenylene ether) block is a residue of the polymerization of the monohydric phenol. In some embodiments, the poly(phenylene ether) block comprises arylene ether repeating units having the structure:

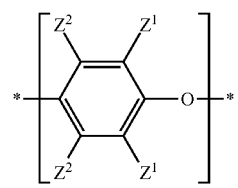

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atoms; and each $Z_2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atom.

In some embodiments, the poly(phenylene ether) block comprises 2,6-dimethyl-1,4-phenylene ether repeating units, that is, repeating units having the structure:

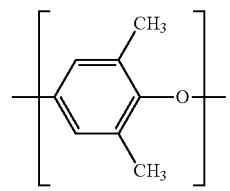

or 2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure:

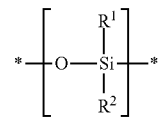

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure:

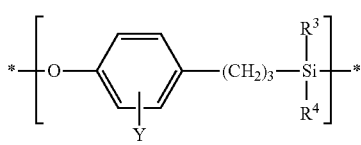

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, $R^3$ and $R^4$ are $C_1$-$C_6$ alkyl, specifically $C_1$-$C_3$ alkyl, more specifically methyl. In some embodiments, the polysiloxane repeating units comprise dimethylsiloxane (—Si(CH$_3$)$_2$O—) units. In some embodiments, the polysiloxane block has the structure:

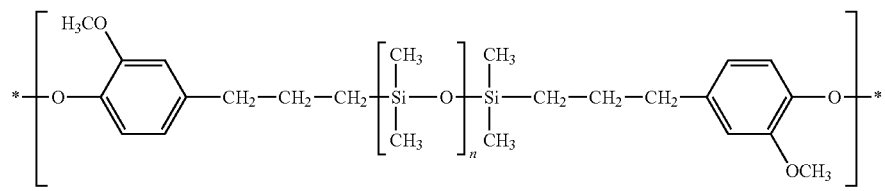

wherein n is 35 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case poly(phenylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block comprises, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

The mixture of a poly(phenylene ether) homopolymer and a poly(phenylene ether) polysiloxane block copolymer comprises 1 to 8 weight percent siloxane repeating units and 12 to 99 weight percent arylene ether repeating units, based on the total weight of the thermoplastic blend. Within these ranges, the weight percent of siloxane repeating units can be 2 to 7 weight percent, specifically 3 to 6 weight percent, more specifically 4 to 5 weight percent; and the weight percent arylene ether repeating units can be 50 to 98 weight percent, specifically 70 to 97 weight percent, more specifically 90 to 96 weight percent.

As mentioned above, the mixture of a poly(phenylene ether) homopolymer and a poly(phenylene ether) polysiloxane block copolymer is the product of a process comprising oxidatively copolymerizing a monomer mixture comprising a monohydric phenol and a hydroxyaryl-terminated polysiloxane. As such, the process is simpler than poly(phenylene ether)-polysiloxane block copolymer synthesis methods that require the coupling of pre-formed poly(phenylene ether) and polysiloxane blocks.

The mixture as described herein comprising the poly(phenylene ether) homopolymer and a poly(phenylene ether) polysiloxane block copolymer has a weight average molecular weight of at least 30,000 atomic mass units. In some embodiments the weight average molecular weight is 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the number average molecular weight is 10,000 to 50,000 atomic mass units, specifically 10,000 to 30,000 atomic mass units, more specifically 14,000 to 24,000 atomic mass units. Chromatographic methods are available for determining molecular weight.

The mixture can also include relatively small amounts of very low molecular weight species. Thus, in some embodiments, the mixture comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the mixture can also include relatively small amounts of very high molecular weight species. Thus, in some embodiments, mixture comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having an molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the mixture of a poly(phenylene ether) homopolymer and a poly(phenylene ether) polysiloxane block copolymer has an intrinsic viscosity of at least 0.3 deciliter per gram, as measured at 25° C. in chloroform. The intrinsic viscosity can be 0.3 to 0.6 deciliter per gram, specifically 0.3 to 0.5 deciliter per gram, still more specifically 0.31 to 0.55 deciliter per gram, yet more specifically 0.35 to 0.47 deciliter per gram, and yet more specifically 0.385 to 0.425 deciliter per gram.

One indication of the efficiency with which the hydroxyaryl-terminated polysiloxane is incorporated into block copolymer is the low concentration of so-called poly (phenylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(phenylene ether) tail group has the structure:

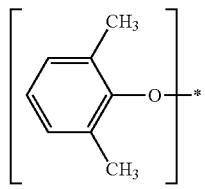

wherein the 3-, 4-, and 5-positions of the ring are substituted with hydrogen atoms (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. Thus, in some embodiments, the monohydric phenol consists of 2,6-dimethylphenol, and the thermoplastic of comprises less than or equal to 0.4 weight percent, specifically 0.2 to 0.4 weight percent, of 2,6-dimethylphenoxy groups, based on the weight of the thermoplastic blend.

The mixture containing the poly(phenylene ether)-polysiloxane block copolymer can further include groups derived from a diphenoquinone, which is itself an oxidation product of the monohydric phenol. For example, when the monohydric phenol is 2,6-dimethylphenol, the poly(phenylene ether)-polysiloxane can comprise 1.1 to 2.0 weight percent of 2,6-dimethyl-4-(3,5-dimethyl-4-hydroxyphenyl)phenoxy groups.

The mixture can be isolated from solution by an isolation procedure that minimizes volatile and nonvolatile contaminants. For example, in some embodiments, the poly(phenylene ether)-polysiloxane copolymer comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the poly(phenylene ether)-polysiloxane copolymer comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal.

The mixture containing the poly(phenylene ether)-polysiloxane can be prepared by a method comprising oxidatively copolymerizing a monohydric phenol and a hydroxyaryl-terminated polysiloxane to form a poly(phenylene ether)-polysiloxane; wherein the oxidative copolymerization is conducted with a reaction time greater than or equal to 80 minutes; wherein the hydroxyaryl-terminated polysiloxane comprises, on average, 35 to 80 siloxane repeating units and the hydroxyaryl-terminated polysiloxane constitutes 1 to 8 weight percent of the combined weight of the monohydric phenol and the hydroxyaryl-terminated polysiloxane.

In other embodiments, the hydroxyaryl-terminated polysiloxane comprises, on average, 35 to 80 siloxane repeating units; and wherein the hydroxyaryl-terminated polysiloxane constitutes more than 20 and up to 80 weight percent of the combined weight of the monohydric phenol and the hydroxyaryl-terminated polysiloxane.

In some embodiments, the hydroxyaryl-terminated polysiloxane comprises, on average, 40 to 70 siloxane repeating units, specifically 40 to 60 siloxane repeating units, more specifically 40 to 50 siloxane repeating units.

As noted above, in one embodiment, the hydroxyaryl-terminated polysiloxane constitutes 1 to 8 weight percent, 9 to 20 percent, and more than 20 and up to 80 percent of the combined weight of the monohydric phenol and the hydroxyaryl-terminated polysiloxane. Within this range, the hydroxyaryl-terminated polysiloxane can constitute 2 to 7 weight percent, specifically 3 to 6 weight percent, more specifically 4 to 6 weight percent of the combined weight of the monohydric phenol and the hydroxyaryl-terminated polysiloxane.

In some embodiments, the oxidative copolymerization is initiated in the presence of at least 80 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

In some embodiments, the oxidative copolymerization is initiated in the presence of 0 to 50 weight percent of the monohydric phenol, specifically 1 to 30 weight percent of the monohydric phenol, more specifically 2 to 20 weight percent of the monohydric phenol, even more specifically 5 to 10 weight percent of the monohydric phenol.

The oxidative copolymerization is conducted with a reaction time greater than or equal between about 80 and 100 minutes. The reaction time is the elapsed time between initiation and termination of oxygen flow. For brevity, the description herein repeatedly refers to "oxygen" or "oxygen flow", it will be understood that any oxygen containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the mixture can be isolated from solution using methods known in the art for isolating poly(phenylene ether)s from solution. For example, the poly(phenylene ether)-polysiloxane copolymer can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the poly(phenylene ether)-polysiloxane copolymer can be isolated by direct isolation methods, including devolatilizing extrusion.

In some embodiments, the poly(phenylene ether)-polysiloxane comprises 1 to 8 weight percent siloxane repeating units.

In some embodiments, the poly(phenylene ether)-polysiloxane copolymer has a weight average molecular weight of at least 30,000 atomic mass units, specifically 30,000 to 150,000 atomic mass units, more specifically 35,000 to 120,000 atomic mass units, even more specifically 40,000 to 90,000 atomic mass units, yet more specifically 45,000 to 70,000 atomic mass units.

In a very specific embodiment, the poly(phenylene ether)-polysiloxane copolymer has an intrinsic viscosity of about 0.385-0.425 dL/g and a weight percent of incorporated siloxane of at least about 4-6 percent. In another embodiment, the poly(phenylene ether)-polysiloxane copolymer has an intrinsic viscosity of about 0.41 dL/g. In another very specific embodiment, the poly(phenylene ether)-polysiloxane copolymer is described as Example 16 in U.S. Pat. No. 8,017,697. Thus, in one embodiment, the poly(phenylene ether)-polysiloxane copolymer has an intrinsic viscosity of about 0.39 dL/g and a weight percent of incorporated siloxane of at least about 4.78 percent.

In some embodiments, the blend of the present invention contains about 5 to about 55 weight percent, and more specifically about 10 to about 40 weight percent of the poly(phenylene ether)-polysiloxane copolymer. More specifically, the blend of the present invention contains about 10 to about 35 weight percent and more specifically about 15 to about 30 weight percent of the poly(phenylene ether)-polysiloxane copolymer.

Poly(phenylene ether) Particle Size

Very small, "ultra-fine" particles of PPE are used in the present invention. In one embodiment, the ultra-fine PPE particles have a mean particle size of 6.07 microns and a standard deviation of 2.3 microns. In another embodiment, the ultra-fine PPE particles have a mean particle size of 10.9 microns and a standard deviation of 4.7 microns. In yet another embodiment, the ultra-fine PPE particles have a mean particle size of 15.7 microns and a standard deviation of 5.9 microns.

Thus in aspect, the invention is directed to ultrafine particles of poly(phenylene ether) such that the mean particle size (volume distribution) is less than 40 microns as determined by particle size distribution analysis.

In one embodiment of this aspect, the invention is directed to ultrafine particles of poly(phenylene ether) wherein the poly(phenylene ether) is poly(2,6-dimethyl-1,4-phenylene ether) having an intrinsic viscosity of 0.40 deciliters per gram, measured in chloroform at 25° C.

In another embodiment, ultrafine particles of poly(phenylene ether) of claim 1, wherein the poly(phenylene ether) is poly(2,6-dimethyl-1,4-phenylene ether) having an intrinsic viscosity of 0.46 deciliters per gram, measured in chloroform at 25° C.

In another embodiment, the invention is directed to ultrafine particles of poly(arylene ether, wherein the poly(phenylene ether) is poly(2,6-dimethyl-1,4-phenylene ether) having an intrinsic viscosity of 0.30 deciliters per gram, measured in chloroform at 25° C.

In another embodiment, the invention is directed to ultrafine particles of poly(arylene ether, wherein the micronized poly(phenylene ether) has a diameter of 10 to 40 microns.

In another embodiment, the invention is directed to ultrafine particles of poly(arylene ether, wherein the micronized poly(phenylene ether) has a diameter of 12 to 38 microns.

In another embodiment, the invention is directed to ultrafine particles of poly(arylene ether, wherein the micronized poly(phenylene ether) has a mean particle size of 6 microns.

In another embodiment, the invention is directed to ultrafine particles of poly(arylene ether, wherein the micronized poly(phenylene ether) has a mean particle size of 10 microns.

In another embodiment, the invention is directed to ultrafine particles of poly(arylene ether, wherein the micronized poly(phenylene ether) has a mean particle size of 15 microns.

In another embodiment, the invention is directed to ultrafine particles of poly(arylene ether, wherein 90 percent of the particle volume distribution of the micronized poly(phenylene ether) is below 8 microns.

In another embodiment, the invention is directed to ultrafine particles of poly(arylene ether, wherein 90 percent of the particle volume distribution of the micronized poly(phenylene ether) is below 775 microns.

In another embodiment, the invention is directed to ultrafine particles of poly(arylene ether, wherein 90 percent of the particle volume distribution of the micronized poly(phenylene ether) is below 17 microns.

In another embodiment, the invention is directed to ultrafine particles of poly(arylene ether, wherein 90 percent of the particle volume distribution of the micronized poly(phenylene ether) is below 23 microns.

In another embodiment, the invention is directed to ultrafine particles of poly(arylene ether, wherein 50 percent of the particle volume distribution of the micronized poly(phenylene ether) is below 6 microns.

In another embodiment, the invention is directed to ultrafine particles of poly(arylene ether, wherein 50 percent of the particle volume distribution of the micronized poly(phenylene ether) is below 10 microns.

In another embodiment, the invention is directed to ultrafine particles of poly(arylene ether, wherein 50 percent of the particle volume distribution of the micronized poly(phenylene ether) is below 15 microns.

In another embodiment, the invention is directed to ultrafine particles of poly(arylene ether, wherein 10 percent of the particle volume distribution of the micronized poly(phenylene ether) is below 4 microns.

In another embodiment, the invention is directed to ultrafine particles of poly(phenylene ether), wherein 10 percent of the particle volume distribution of the micronized poly(phenylene ether) is below 6 microns In another embodiment, the invention is directed to ultrafine particles of poly(arylene ether, wherein 10 percent of the particle volume distribution of the micronized poly(phenylene ether) is below 9 microns Ultrafine PPE particles can be obtained according to methods readily available to the skilled artisan. For example, the micronized PPE can be obtained by jet milling, ball milling, pulverizing, air milling, or grinding commercial PPE. A classifier is often used together with mills for the continuous extraction of rather fine particles from the material being milled. Where "classification" is the sorting of the initial distribution of particles to achieve a desired degree of uniformity. The classification system can be a screen of certain mesh size on the walls of the grinding chamber. Once the milled particles reach sizes to pass through the screen they are removed. Larger particles remain in the chamber for additional milling and size reduction.

Air classification is another method of removing the liner particles from milling. Air classifiers include static classifiers (cyclones), dynamic classifiers (single stage, multi-stage), cross-flow classifiers, counter-flow classifiers (elutriators). In general, air classifiers to convey the particle from the mill to the classifying operation where the fine particles are carried out with the air to a collector. The course particles being too heavy to be carried out are returned to the mill for further milling and size reduction. In larger operations air classification would be preferred (more efficient). In smaller operations a screen would be used.

In one embodiment, the micronized PPE can be obtained by jet milling commercial PPE. The resulting particles have the designation PPE-A, PPE-B, and PPE-C. PPE-A, PPE-B, and PPE-C, were milled and removed from the milling chamber by passing through a screen with 6, 14, and 20 micron holes, respectively. In the jet milling technique employed to prepare ultrafine PPE particles, compressed nitrogen gas was introduced into the specially designed nozzles to create supersonic grinding stream. Solid particles of commercial PPE were injected into this violent, turbulent, rotating stream. Rotation generated high speed particle collisions create increasingly smaller particles via particle-on-particle impact collisions. Large particles were held in the grinding area by centrifugal force while centripetal force was used to drive finer particles towards the center of the discharge. A sieve of a desired upper size limit was then used to recover particles with precise size lower than the sieve nominal opening. Larger particles are recycled to the reduction size chamber for further grinding.

In addition, the micronized PPE can be obtained by sieving commercial PPE, for instance, by using appropriately sized sieve pans. Appropriately sized sieve pans include, for instance, U.S. Standard No. 200 (metric size 75 microns), No. 100 (150 microns), and No. 60 (250 microns), and No. 40 (425 microns). These particles will have the designation PPE-D, PPE-E, PPE-F, and PPE-G respectively.

A description of the ultrafine PPE particles is provided in Table 1. Particle size and shape distribution was determined using the Camsizer® XT from Retsch Technology GmbH operating in air dispersion mode.

The particle size is reported as a circular equivalent diameter. Where the 3-dimensional particle is imaged as 2-dimensional particle, the area of 2-dimensional image is converted to a circle with equal area, and the diameter of the circle measured. The aspect ratio is calculated by dividing the breath by the length of the 2-dimensional image.

Particle size measurements are calibrated using as certified NIST traceable highly precise (±0.1 microns) standard provided by Retsch Technology. The reference object is an electron beam lithographic pattern that simulates the entire measuring dynamic range of differently sized particles (1-3000 microns).

The validation of particle size was carried out using a NIST traceable DRI-CAL particle size secondary standard. The standard is comprised of polystyrene/divinylbenzene polymeric beads (mean diameter; 23.2 microns±0.7 microns).

In one embodiment, 5 to 50 percent by weight of the micronized poly(phenylene ether) is used. In another embodiment, 10 to 40 percent by weight of the micronized poly(phenylene ether) is used. In another embodiment, 15 to 30 percent by weight of the micronized poly(phenylene ether) is used.

Thermoplastic Polyurethane

In addition to the micronized PPE, the blend comprises a thermoplastic polyurethane (TPU). TPUs are made by the reacting an isocyanate and a polyol in a bulk or solution polymerization process that results in linear polymeric chains combined in block structures. A variety of isocyanates and polyols are used to produce elastomers that can range from hard and stiff to soft and flexible. The finished elastomers are supplied as granules or pellets for processing by traditional thermoplastic processing techniques such as extrusion, injection molding and calendering.

TPUs are typically prepared from 4,4'-methylenebis(phenyl isocyanate (MDI) or MDI variants. The MDI is reacted with a substantially linear polyether or polyester diol and with a chain-extending diol of a low molecular weight in either a one-step or as two-step reaction. Generally, 1,4-butanediol is used as the chain extender with ethylene glycol and 1,6-hexane diol of limited significance. Diamines are used only in special cases as chain extenders because they cannot be processed by normal thermoplastic methods without decompo-

TABLE 1

Properties of ultrafine PPE particles

| Designation | Method | Mean particle size, microns (volume distribution) | Standard Deviation | D(v, 0.9), microns | D(v, 0.5), microns | D(v, 0.1), microns | Aspect Ratio |
|---|---|---|---|---|---|---|---|
| PPE-A | Milling | 6.07 | 2.3 | 8.1 | 5.9 | 4.0 | 0.709 |
| PPE-B | Milling | 10.9 | 4.7 | 17.0 | 10.4 | 5.5 | 0.724 |
| PPE-C | Milling | 15.7 | 5.9 | 23.3 | 15.2 | 8.6 | 0.855 |
| PPE-D | Seive: U.S. standard No. 200 (metric size 75 μm) | 38.2 | 24.1 | 73.6 | 35.2 | 8 | 0.753 |
| PPE-E | Seive: U.S. standard No. 100 (metric size 150 μm) | 87.8 | 54.1 | 160.8 | 87.3 | 16.7 | 0.749 |
| PPE-F | Seive: U.S. standard No. 60 (metric size 250 μm) | 264.1 | 97.6 | 377.7 | 275.2 | 122.6 | 0.747 |
| PPE-G | Seive: U.S. standard No. 40 (metric size 425 μm) | 538.8 | 197.9 | 769.6 | 541.5 | 369.5 | 0.759 |

D(v, 0.1) - 10% of the volume distribution is below this value
D(v, 0.5) - 50% of the volume distribution is below this value
D(v, 0.9) - 90% of the volume distribution is below this value sition of the material. The nature of the polyol used accounts for the main differences between TPU grades.

TPUs are based on three types of polyols: polyether diols, polyester diols and polycaprolactone diols. The polyester diols are usually condensation products of dicarboxylic acid such as succinic acid or adipic acid and one or more simple aliphatic diols in the series from ethylene glycol to 1,6-hexane diol. Typical examples of polyether-diols that are used include poly(oxypropylene) diols and poly(oxytetramethylene) diols. The primary advantage of polyether-based polyols over polyester-based polyols is higher hydrolysis resistance. Polycaprolactone-based copolymers offer both enhanced hydrolysis resistance and low temperature flexibility.

MDI is the most common diisocyanate used in the production of TPUs. Only in special cases are TODI (3,3-dimethyl-4,4-biphenyldiisocyanate), HDI (1,6-diisocyanatohexane) and IPDI (1-isocyanato-3-isocyanatomethyl-3,5,5-trimethylcylohexane) used, the last two for making light-stable materials (for a world market of about 5 thousand metric tons). A specialty TPU for very demanding applications is made by reacting PPDI (polyphenylene diisocyanate) with a polycaprolactone-based diol. Other specialty TPUs are available that bridge the gap between rigid plastics and rubbery elastomers. One example is the polycarbonate/TPU blends that are promoted for special requirements, such as solvent resistance.

TPUs are commercially available from a wide variety of suppliers in the United States and elsewhere, including: BASF Corporation (Elastollan™®); Bayer Material Science (Desmoplan®, Desmoflex®, Texin®); Dow Chemical Company (Pellethane®); Huntsman LLC (Irogran®, Irostic®, Irodur®, Irocoat®, Krytalgran®); and Noveon (Estaloc®, Estane®).

In one embodiment, the TPU is a TPU made from MDI and a polyester diol.

In another embodiment, the TPU is made from MDI and a polyether diol.

This invention includes the use of both polyester diol or polyether diol derived TPUs, and includes, for example, the use of Elastollan™ C85 and 1185 which are derived from poly(caprolactone diol) and poly(tetramethylene glycol), respectively and the di-isocyanate monomer 4,4'-methylenebis(phenyl isocyanate) (MDI). Elastollan™ is the registered trademark of BASF Corporation.

In one embodiment, the TPU comprises about 50 to about 95 percent of the blend based on the total weight of the blend.

In another embodiment, the TPU comprises about 60 to about 90 percent of the blend based on the total weight of the blend.

In another embodiment, the TPU comprises about 70 to about 85 percent of the blend based on the total weight of the blend.

In another embodiment, the TPU comprises about 75 to about 80 percent of the TPU based on the total weight of the blend.

In one embodiment, the TPU is Elastollan™ C85.

In another embodiment, the TPU is Elastollan™ C85.
Other Components

The polymer blend may optionally contain other components.

For example, the polymer blend may contain one or more flame retardants. Non-halogen flame retardants that are used for thermoplastic polyurethanes can be in the form of additive or reactive materials.

Additive type flame-retardants include aluminum trihydrate, magnesium hydroxide, zinc borate (used in conjunction with either alumina trihydrate or magnesium hydroxide), ammonium pentaborate, or phosphorus containing materials such as ammonium polyphosphate, melamine polyphosphate, melamine salt of pentaerythritol acid phosphate, dimethylmethylphosphonate, aluminum diethylphosphinate, and phosphate esters (triphenyl phosphate, triaryl phosphate, triethyl phosphate, dimethyl methylphosphonate, and resorcinol bis(diphenyl phosphate)).

Reactive type flame-retardants include polyols which contain phosphorus groups. 10-((2,5-dihydroxyphenyl)-10H-9-oxa-10-phospha-phenanthrene-10-oxide, phosphorus-containing lactone-modified polyesters, ethylene glycol bis (diphenyl phosphate), neopentylglycol bis(diphenyl phosphate), amine- and hydroxyl-functionalized siloxane oligomers. These flame retardants can be used alone or in conjunction with other flame retardants.

In one embodiment, the flame retardant is a phosphorus-containing flame retardant. In particular embodiments, the phosphorus-containing flame retardant is ammonium polyphosphate (APP) or melamine polyphosphate (MPP).

In this and other embodiments, the amount of flame retardant can vary from about 3 weight percent to 20 weight percent, based on the total weight of the composition. More preferably, when the flame retardant is APP, the weigh percent of APP is 3 to 10 weight percent based on the total weight of the composition. When the flame retardant is MPP, the weight percent of APP is 7 to 20 weight percent based on the total weight of the composition.

In another embodiment, a quantity of phosphorus-containing flame retardant is used sufficient to supply 0.8 to 3 weight percent of phosphorus based on the total weight of the composition. More preferably, when the flame retardant is APP, a quantity of APP is used sufficient to supply 1.2 to 2.5 weight percent of phosphorus based on the total weight of the composition. When the flame retardant is MPP, a quantity of APP is used sufficient to supply 1.0 to 2.5 weight percent of phosphorus based on the total weight of the composition.

The polymer blends may additionally contain other additives, including mold release agents (typically derivatives of fatty acids, or silicones, or certain fluoroplastics); anti-degradants (such as aromatic carbodiimides, which are used with polyester-based TPUs to reduce their hydrolytic degradation); antioxidants (such as sterically hindered phenols and certain amines used to reduce the degradation by heat and oxidation); UV absorbers (such as benzophenones or benzotriazols combined with sterically hindered amines); mineral fillers (such as calcium carbonate, talc, and silica/silicate fillers); reinforcing fillers (such as mica, glass fibers, organic fibers); lubricants (such as graphite, molybdenum sulfide, polytetrafluoroethylene micropowders, or silicone oil); plasticizers; and pigments and dyes.

EMBODIMENTS

In one embodiment, the invention comprises a polymer blend comprising:
(a) 5 to 50 percent by weight of the micronized poly(phenylene ether), wherein the mean particle size of the poly(phenylene ether) is 9 microns or less;
(b) 50 to 95 percent by weight of a thermoplastic polyurethane;
wherein the weight percents are based on the total weight of the blend.
In another embodiment, the blend comprises:
(a) Ultrafine particles of poly(phenylene ether) wherein the ultrafine particulate poly(phenylene ether) has a mean particle size of 6 microns.

(b) Ultrafine particles of poly(phenylene ether) wherein 90 percent of the particle volume distribution of the ultrafine particulate poly(phenylene ether) is below 8 microns.
(c) Ultrafine particles of poly(phenylene ether) wherein 50 percent of the particle volume distribution of the ultrafine particulate poly(phenylene ether) is below 6 microns.

In another embodiment, the blend comprises:
(a) Ultrafine particles of poly(phenylene ether) wherein the ultrafine particulate poly(phenylene ether) has a mean particle size of 10 microns.
(b) Ultrafine particles of poly(phenylene ether) wherein 90 percent of the particle volume distribution of the ultrafine particulate poly(phenylene ether) is below 17 microns.
(c) Ultrafine particles of poly(phenylene ether) wherein 50 percent of the particle volume distribution of the ultrafine particulate poly(phenylene ether) is below 10 microns.

In another embodiment, the blend comprises:
(a) Ultrafine particles of poly(phenylene ether) wherein the ultrafine particulate poly(phenylene ether) has a mean particle size of 15 microns.
(b) Ultrafine particles of poly(phenylene ether) wherein 90 percent of the particle volume distribution of the ultrafine particulate poly(phenylene ether) is below 23 microns.

In one embodiment, the blend comprises ultrafine particles of poly(phenylene ether), wherein the ultrafine particulate poly(phenylene ether) has a mean particle size of 6 microns. In a further embodiment, 90 percent of the particle volume distribution of the ultrafine particulate poly(phenylene ether) is below 8 microns. In a further embodiment, 50 percent of the particle volume distribution of the ultrafine particulate poly(phenylene ether) is below 6 microns.

In these and other embodiments, the poly(phenylene ether) is a particulate poly(phenylene ether) having a mean particle size of 6 microns. In these and other embodiments, the poly(phenylene ether) is a particulate poly(phenylene ether) having a mean particle size of 11 microns. In these and other embodiments, the poly(phenylene ether) is a particulate poly(phenylene ether) having a mean particle size of 16 microns. In these and other embodiments, the poly(phenylene ether) is poly(phenylene ether) having a mean particle size of 6 to 10 microns. In these and other embodiments, the poly(phenylene ether) is a particulate poly(phenylene ether) having a mean particle size of 6 to 16 microns. In these and other embodiments, the poly(phenylene ether) is a particulate poly(phenylene ether) having a mean particle size of 11 to 16 microns.

In another embodiment, the blend comprises:
(a) 10 to 40 percent by weight of the ultrafine particulate poly(phenylene ether), wherein the mean particle size of the poly(phenylene ether) is 9 microns or less;
(b) 60 to 90 percent by weight of a thermoplastic polyurethane;
wherein the weight percents are based on the total weight of the blend.

In another embodiment, the blend comprises:
(a) 10 to 40 percent by weight of the ultrafine particulate poly(phenylene ether), wherein the mean particle size of the poly(phenylene ether) is 9 microns or less;
(b) 60 to 90 percent by weight of an Elastollan™ 1185 or Elastollan™ C85;
wherein the weight percents are based on the total weight of the blend.

In another embodiment, the poly(phenylene ether) is poly (2,6-dimethyl-1,4-phenylene ether) having an intrinsic viscosity of between 0.30 deciliters to 1.5 deciliters per gram, measured in chloroform at 25° C.

In another embodiment, the ultrafine particles of poly(phenylene ether) have a mean particle size of 3.8 microns to 8.4 microns.

In another embodiment, the ultrafine particles of poly(phenylene ether) of having a mean particle size of 6 microns.

In another embodiment, 90 percent of the particle volume distribution of the ultrafine particulate poly(phenylene ether) is below 8 microns.

Any of the above embodiments may additionally comprise a flame retardant. In one embodiment, the flame retardant is a phosphorus-containing flame retardant. More particularly, the flame retardant is APP or MPP. The amount of flame retardant can vary from about 3 weight percent to 20 weight percent, based on the total weight of the composition. More preferably, when the flame retardant is APP, the weight percent of APP is 3 to 10 weight percent based on the total weight of the composition. When the flame retardant is MPP, the weight percent of APP is 7 to 20 weight percent based on the total weight of the composition.

Alternatively, the quantity of phosphorus-containing flame retardant that is used is sufficient to supply 0.8 to 3 weight percent of phosphorus based on the total weight of the composition. More preferably, when the flame retardant is APP, a quantity of APP is used sufficient to supply 1.2 to 2.5 weight percent of phosphorus based on the total weight of the composition. When the flame retardant is MPP, a quantity of MPP is used sufficient to supply 1.0 to 2.5 weight percent of phosphorus based on the total weight of the composition.

In a further embodiment, the blend comprises:
(a) 10 to 40 percent by weight of the ultrafine particulate poly(phenylene ether), wherein the mean particle size of the poly(phenylene ether) is 9 microns or less;
(b) 60 to 90 percent by weight of a thermoplastic polyurethane;
(c) 3 to 20 weight percent of a phosphorus-containing flame retardant, based on the total weight or the composition.
wherein the weight percents are based on the total weight of the blend.

In a further embodiment, the blend comprises:
(a) 10 to 40 percent by weight of the ultrafine particulate poly(phenylene ether), wherein the mean particle size of the poly(phenylene ether) is 9 microns or less;
(b) 60 to 90 percent by weight of a thermoplastic polyurethane;
(c) 3 to 20 weight percent of a phosphorus-containing flame retardant selected from APP or MPP or a mixture thereof, based on the total weight of the composition.

In a further embodiment, the blend comprises:
(a) 10 to 40 percent by weight of the ultrafine particulate poly(phenylene ether), wherein the mean particle size of the poly(phenylene ether) is 9 microns or less;
(b) 60 to 90 percent by weight of a thermoplastic polyurethane;
(c) a phosphorus-containing flame retardant selected from APP or MPP or a mixture thereof, wherein the amount of phosphorus in the flame retardant is 0.8 to 3 weight percent based on the total weight of the composition.

Process

In another aspect, the invention is also directed to a process for preparing a blend comprising:
- (a) 5 to 50 percent by weight of the ultrafine particulate poly(phenylene ether), wherein the mean particle size of the poly(phenylene ether) is 6 to 40 microns;
- (b) 50 to 95 percent by weight of a TPU; comprising the steps of:
  - (i) blending, the poly(phenylene ether) into the TPU at a temperature that is lower than the glass transition temperature of the poly(phenylene ether).

In another aspect, the invention is also directed to a process for preparing a blend comprising:
- (a) 10 to 40 percent by weight of the ultrafine particulate poly(phenylene ether), wherein the mean particle size of the poly(phenylene ether) is 6 to 40 microns;
- (b) 60 to 90 percent by weight of a TPU; comprising the steps of:
  - (i) blending the poly(phenylene ether) into the TPU at a temperature of between about 120 and 210° C.

In another aspect, the invention is also directed to a process for preparing a blend comprising:
- (a) 15 to 30 percent by weight of the ultrafine particulate poly(phenylene ether), wherein the mean particle size of the poly(phenylene ether) is 6 to 40 microns;
- (b) 70 to 85 percent by weight of a TPU; and
  - (i) blending the poly(phenylene ether) into the TPU at a temperature of between about 120 and 210° C.

Article

In another aspect, the invention is directed to an article prepared from a blend comprising any of the embodiments of the blend described previously.

More particularly, the invention is directed to an article prepared from a blend comprising:
- (a) 5 to 50 percent by weight of the ultrafine particulate poly(phenylene ether), wherein the mean particle size of the poly(phenylene ether) is 6 to 40 microns;
- (b) 50 to 95 percent by weight of a TPU;

by a process comprises the steps of (i) combining via extrusion the poly(phenylene ether), and TPU at temperatures at or below 210° C.; (ii) injection molding or compression molding the blend of poly(phenylene ether) and TPU at temperatures at or below 210° C.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

EXAMPLES

The materials used to prepare the blends are listed in Table 2.

TABLE 2

| Component | Trade Name and Supplier |
|---|---|
| PPE-A | Poly(2,6-dimethyl-1,4-phenylene ether), CAS Reg. No. 24938-67-8, having an intrinsic viscosity of 0.4 deciliters per gram, measured in chloroform at 25° C., and obtained as PPO 640 resin from SABIC Innovative Plastics. ("0.4 IV PPE) 6.07 mean particle size (from Table 1) |
| TPU-1 | Polyester based thermoplastic polyurethane commercially available from BASF as Elastollan ™ C85 |

TABLE 2-continued

| Component | Trade Name and Supplier |
|---|---|
| TPU-2 | Polyether based thermoplastic polyurethane commercially available from BASF as Elastollan ™ 1185 |

The ASTM and UL tests used to characterize the blends of the present invention, and the comparative examples, are summarized below in Table 3.

TABLE 3

| Test | Description |
|---|---|
| Density | Density values, expressed in units of grams per cubic centimeter, were determined according to ASTM D 792-08 at 23° C. |
| Shore A Hardness | ASTM D2240 |
| Shore D Hardness | ASTM D2240 |
| Tensile Strength at Yield, MPa | ASTM D 638 |
| Tensile Strength at Break, MPa | ASTM D 638 |
| Elongation at Yield, % | ASTM D 638 |
| Elongation at Break, % | ASTM D 638 |
| VICAT A, ° C. | ASTM D1525-06 |
| Char in Nitrogen, at 600° C., wt % | Thermogravimetric analysis in nitrogen, heating rate 20° C. per minute, the residue at 600° C. |
| Char in Nitrogen, at 700° C., wt % | Thermogravimetric analysis in nitrogen, heating rate 20° C. per minute, the residue at 700° C. |
| Char in Nitrogen, at 800° C., wt % | Thermogravimetric analysis in nitrogen, heating rate 20° C. per minute, the residue at 800° C. |
| Char in Air, at 600° C., wt % | Thermogravimetric analysis in air, heating rate 20° C. per minute, the residue at 600° C. |
| Char in Air, at 700° C., wt % | Thermogravimetric analysis in air, heating rate 20° C. per minute, the residue at 700° C. |
| Char in. Air, at 800° C., wt % | Thermogravimetric analysis in air, heating rate 20° C. per minute, the residue at 800° C. |
| Water Absorption, 24 h/80° C., % | Weight increase after immersion in deionized water |

Blends of micronized PPE with either TPU-1 or TPU-2 were tested against a comparative sample of TPU-1 or TPU-2, respectively. The blends are summarized in Tables 4A and 4B.

TABLE 4A

Blends of Micronized PPE and Elastollan ™ C85 (TPU-1)

| Composition | CEXA | EX1 | EX2 | EX3 | EX4 |
|---|---|---|---|---|---|
| Elastollan ™ C85 (TPU-1) | 100 | 90 | 80 | 70 | 60 |
| Micronized PPE |  | 10 | 20 | 30 | 40 |

TABLE 4B

Blends of Micronized PPE and Elastollan ™ 1185 (TPU-2)

| Composition | CEXB | EX5 | EX6 | EX7 | EX8 |
|---|---|---|---|---|---|
| Elastollan ™ 1185 (TPU-2) | 100 | 90 | 80 | 70 | 60 |
| Micronized PPE |  | 10 | 20 | 30 | 40 |

Blends of micronized PPE with TPUs were prepared by extrusion below the glass transition temperature of the PPE (215° C.). Test parts of blended micronized PPE and TPUs were prepared by injection molding below the glass transition temperature of the PPE (215° C.).

Compositions were compounded on a Coperion ZSK 18 twin-screw laboratory extruder (18 millimeter screw outer diameter). Extrusion conditions for the blends are summarized in Tables 5A and 5B.

TABLE 5A

Elastollan ™ C85 (TPU-1) and Micronized PPE Extrusion Conditions

| | Zone-1 °C. | Zone-2 °C. | Zone-3 °C. | Zone-4 °C. | Zone-5 °C. | Zone-6 °C. | Die °C. | Rpm's | Torque |
|---|---|---|---|---|---|---|---|---|---|
| EX1 | 140 | 150 | 160 | 170 | 180 | 180 | 180 | 300 | 40 |
| EX2 | 140 | 150 | 160 | 170 | 180 | 180 | 180 | 300 | 40 |
| EX3 | 140 | 150 | 160 | 170 | 180 | 180 | 180 | 300 | 50 |
| EX4 | 140 | 150 | 160 | 170 | 180 | 180 | 180 | 300 | 55 |

TABLE 5B

Elastollan ™ 1185 (TPU-2) and Micronized PPE Extrusion Conditions

| | Zone-1 °C. | Zone-2 °C. | Zone-3 °C. | Zone-4 °C. | Zone-5 °C. | Zone-6 °C. | Die °C. | Rpm's | Torque |
|---|---|---|---|---|---|---|---|---|---|
| EX5 | 140 | 150 | 160 | 170 | 180 | 180 | 180 | 300 | 40 |
| EX6 | 140 | 150 | 160 | 170 | 180 | 180 | 180 | 300 | 40 |
| EX7 | 140 | 150 | 160 | 170 | 180 | 180 | 180 | 300 | 35 |
| EX8 | 140 | 150 | 160 | 170 | 180 | 180 | 180 | 300 | 40 |

Articles for physical property testing were injection molded using as Demag Plastic Group Model 40-80 injection molding machine.

Molding conditions for the blends are summarized below in Tables 6A and 6B.

TABLE 6A

Elastollan ™ C85 (TPU-1) and Micronized PPE Injection Molding Conditions

| | Zone-1 °C. | Zone-2 °C. | Zone-3 °C. | Nozzle °C. | Mold °C. | Injection Pressure psi | Back Pressure psi |
|---|---|---|---|---|---|---|---|
| CEXA | 199 | 199 | 199 | 205 | 27 | 2100 | 50 |
| EX1 | 199 | 199 | 199 | 205 | 27 | 1900 | 50 |
| EX2 | 199 | 199 | 199 | 205 | 27 | 1900 | 50 |
| EX3 | 199 | 199 | 199 | 205 | 27 | 2050 | 50 |
| EX4 | 199 | 199 | 199 | 205 | 27 | 2100 | 50 |

TABLE 6B

Elastollan ™ 1185 (TPU-2) and Micronized PPE Injection Molding Conditions

| | Zone-1 °C. | Zone-2 °C. | Zone-3 °C. | Nozzle °C. | Mold °C. | Injection Pressure psi | Back Pressure psi |
|---|---|---|---|---|---|---|---|
| CEXB | 199 | 199 | 199 | 205 | 27 | 1800 | 50 |
| EX5 | 199 | 199 | 199 | 205 | 27 | 1700 | 50 |
| EX6 | 199 | 199 | 199 | 205 | 27 | 1700 | 50 |
| EX7 | 199 | 199 | 199 | 205 | 27 | 1800 | 50 |
| EX8 | 199 | 199 | 199 | 205 | 27 | 2000 | 50 |

Results

The results of the experiments with blends of micronized PPE and Elastollan™ C85 (TPU-1) are summarized in Tables 7A and 7B. The results of the experiments with blends of micronized PPE and Elastollan™ C85 (TPU-1) are summarized in Tables 7A and 7B. In general, there was a broad enhancement of properties with the use of micronized PPE in TPU as compared to TPU-1 or TPU-2 when tested alone (CEXA or CEXB). To that end, strength increased with increasing levels of micronized PPE while maintaining high elongations. VICAT increased with increasing levels of micronized PPE. Moisture absorption decreased with increasing levels of micronized PPE. Dielectric constant and loss tangent are lowered with increasing levels of micronized PPE. Char increased with increasing levels of micronized PPE. The increased char would suggest that less fuel is being produced from thermal decomposition. This could have implications for ease of flame retarding.

Figure 2:
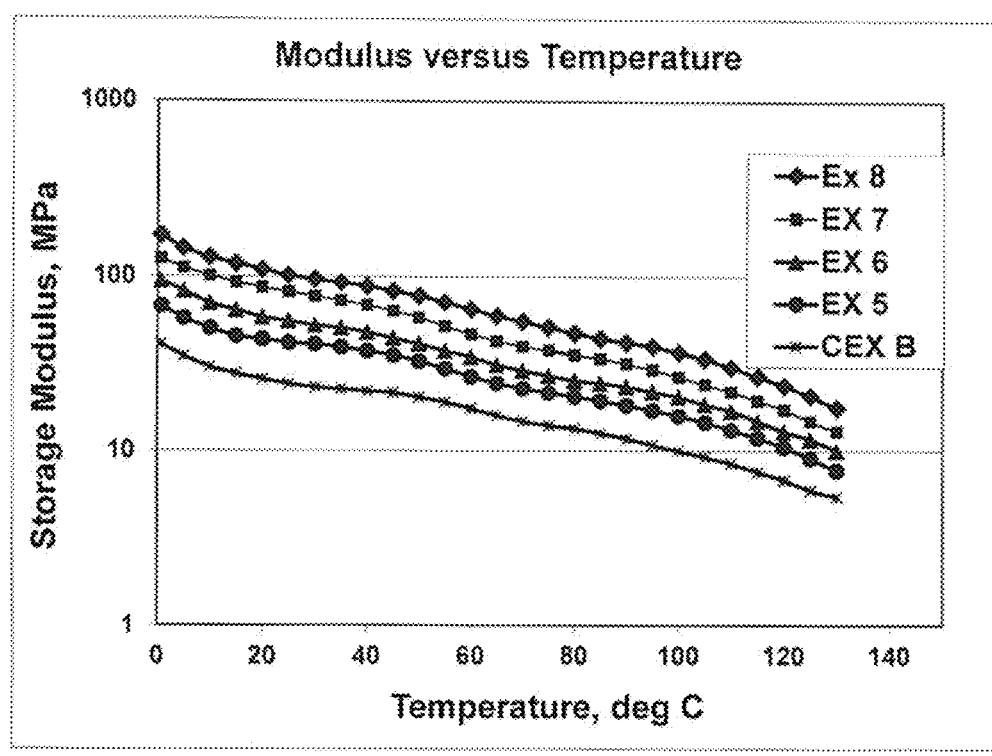
FIG. 2 depicts modulus at elevated temperature as measured by DMA for a blend of micronized PPE and Elastollan™ 1185 (TPU-2).
Figure 3:
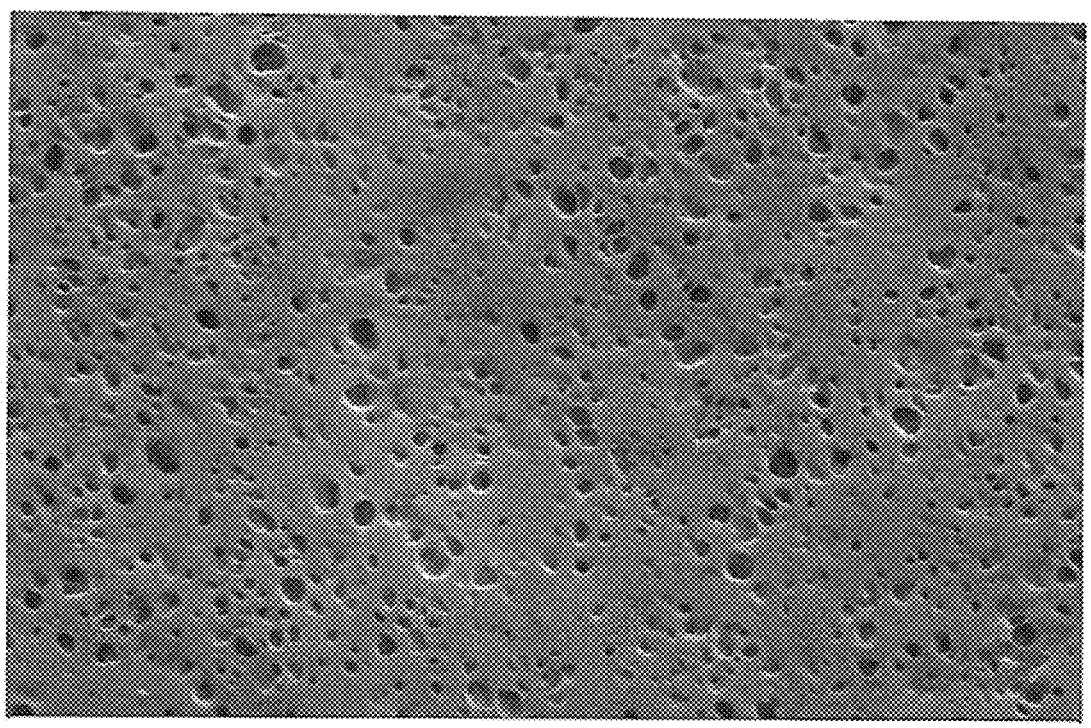
FIG. 3 depicts a scanning electron micrograph of Example 3.
Figure 4:
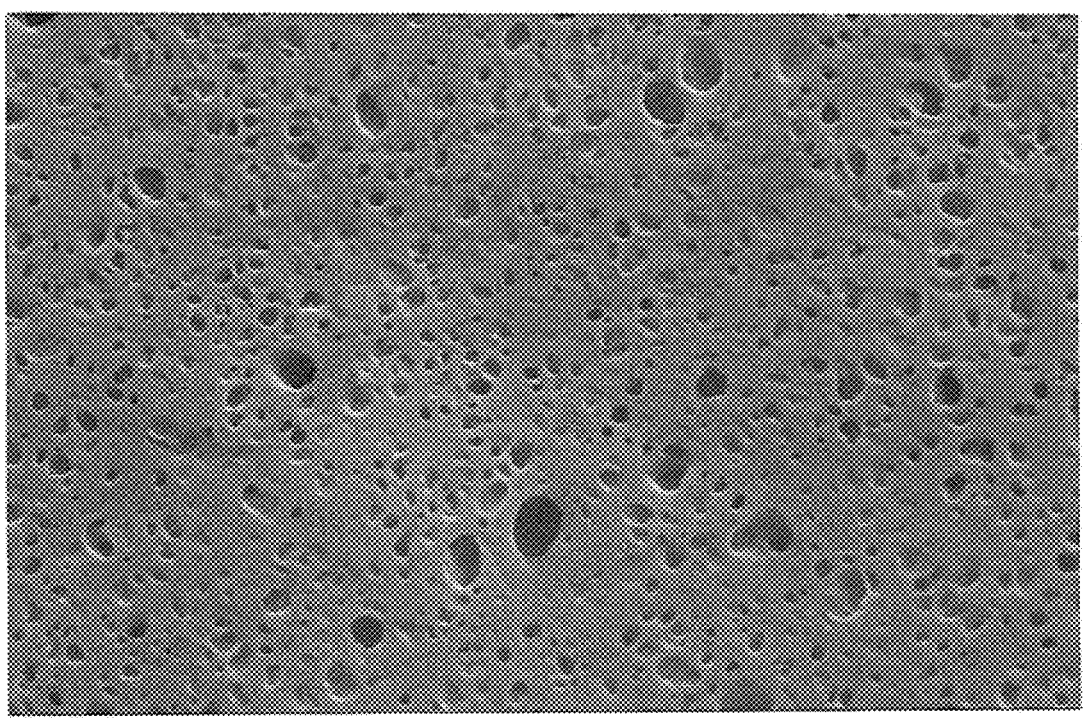
FIG. 4 depicts a scanning electron micrograph of Example 9.
Figure 5:
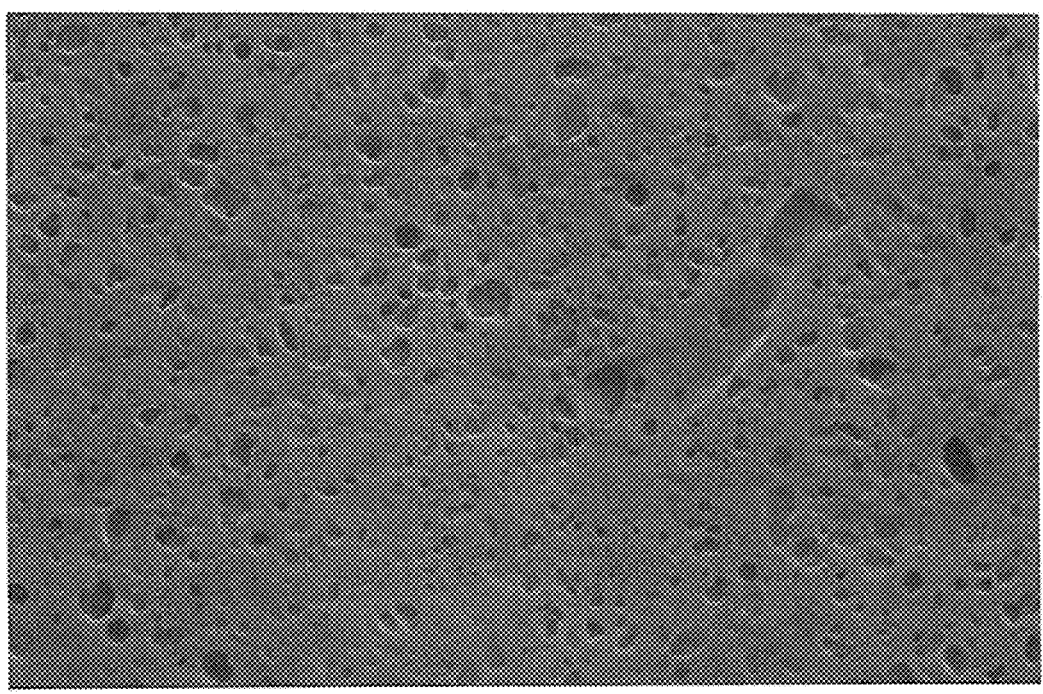
FIG. 5 depicts a scanning electron micrograph of Example 10.
Figure 6:
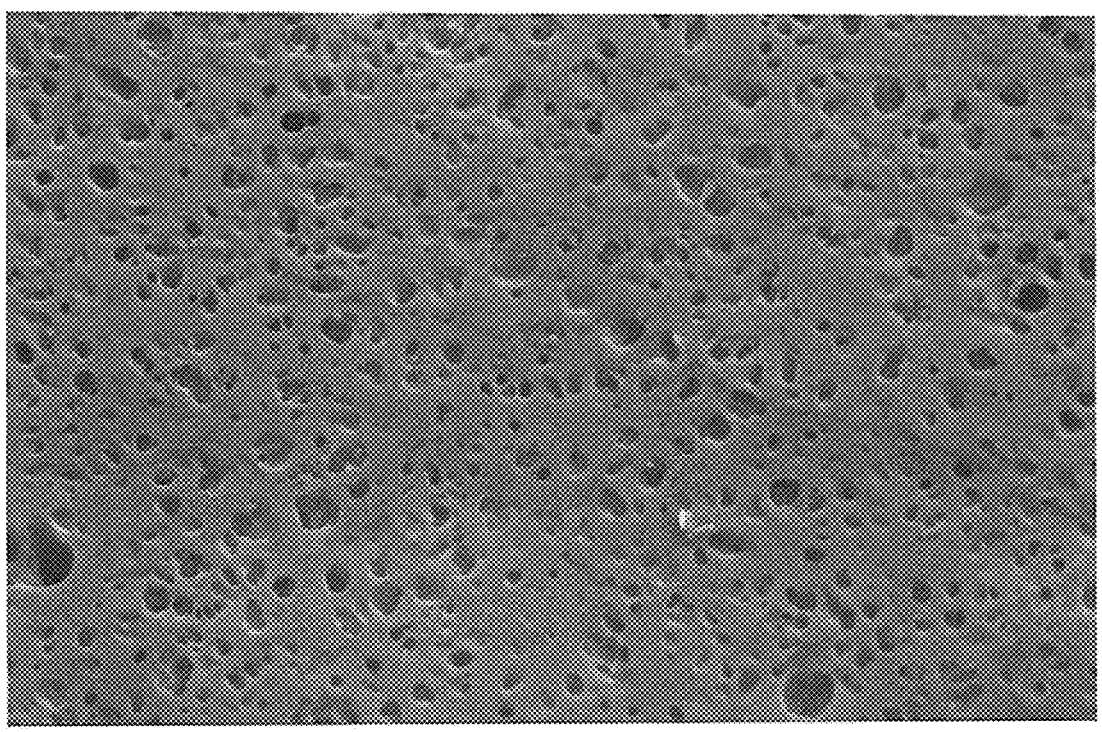
FIG. 6 depicts a scanning electron micrograph of Example 11.
Figure 7:
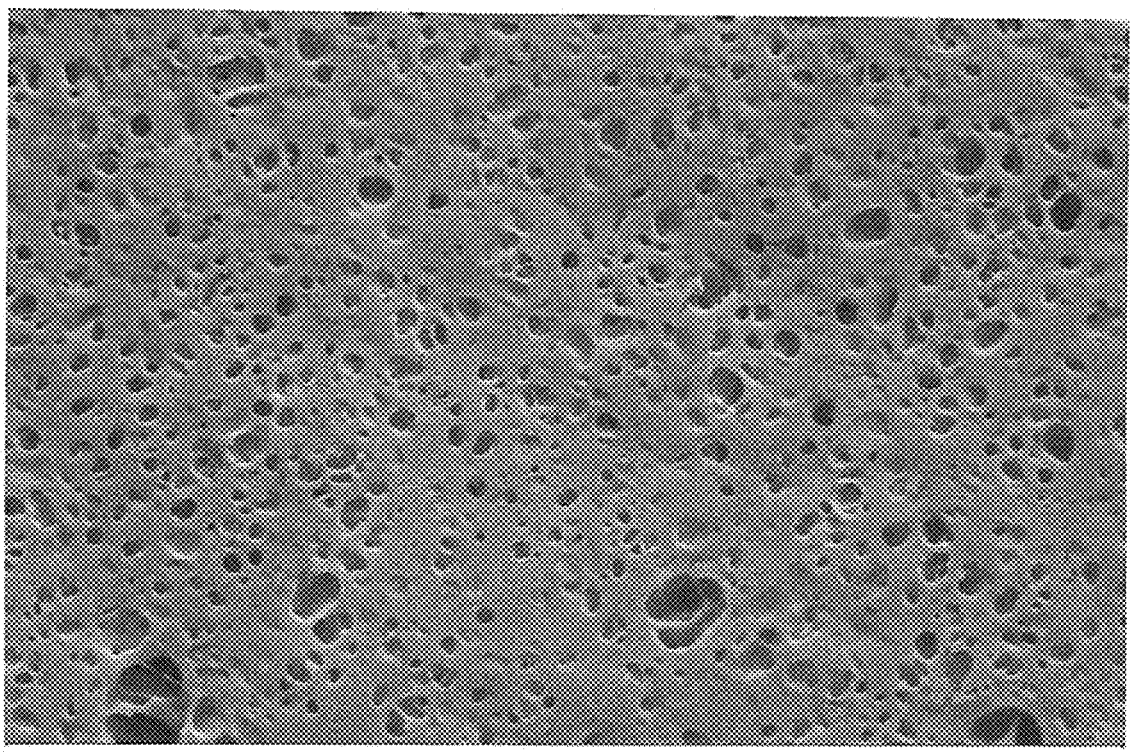
FIG. 7 depicts a scanning electron micrograph of Example 12.
Figure 8:
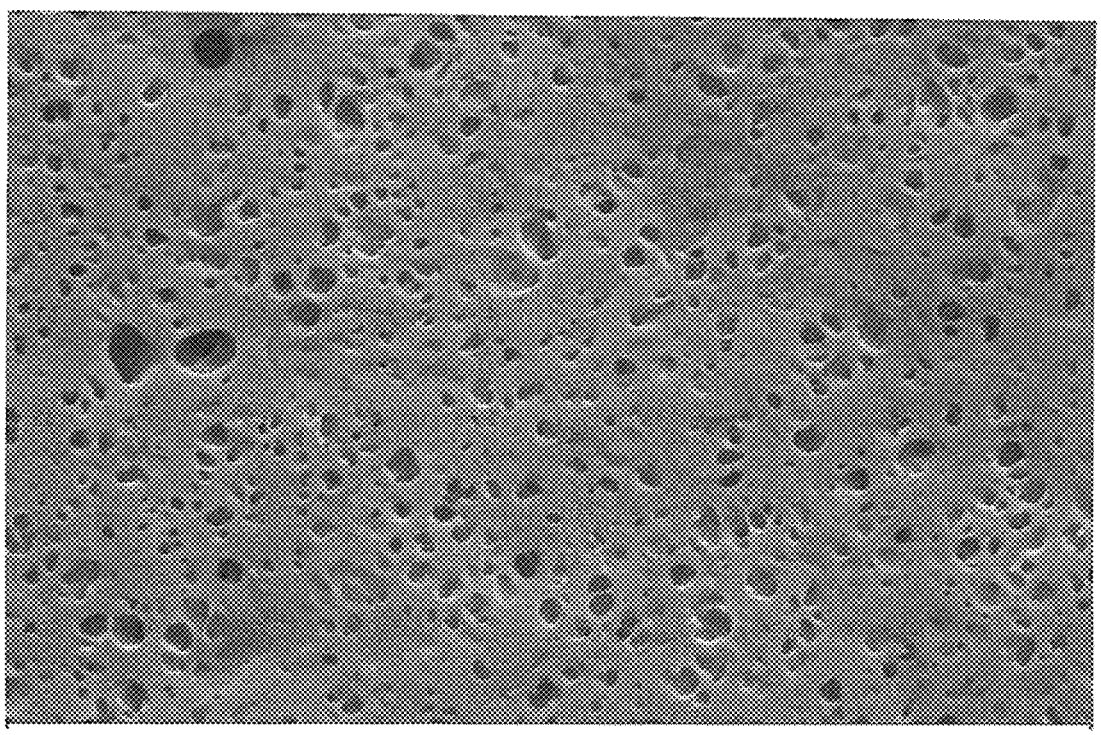
FIG. 8 depicts a scanning electron micrograph of Example 13.
Figure 9:
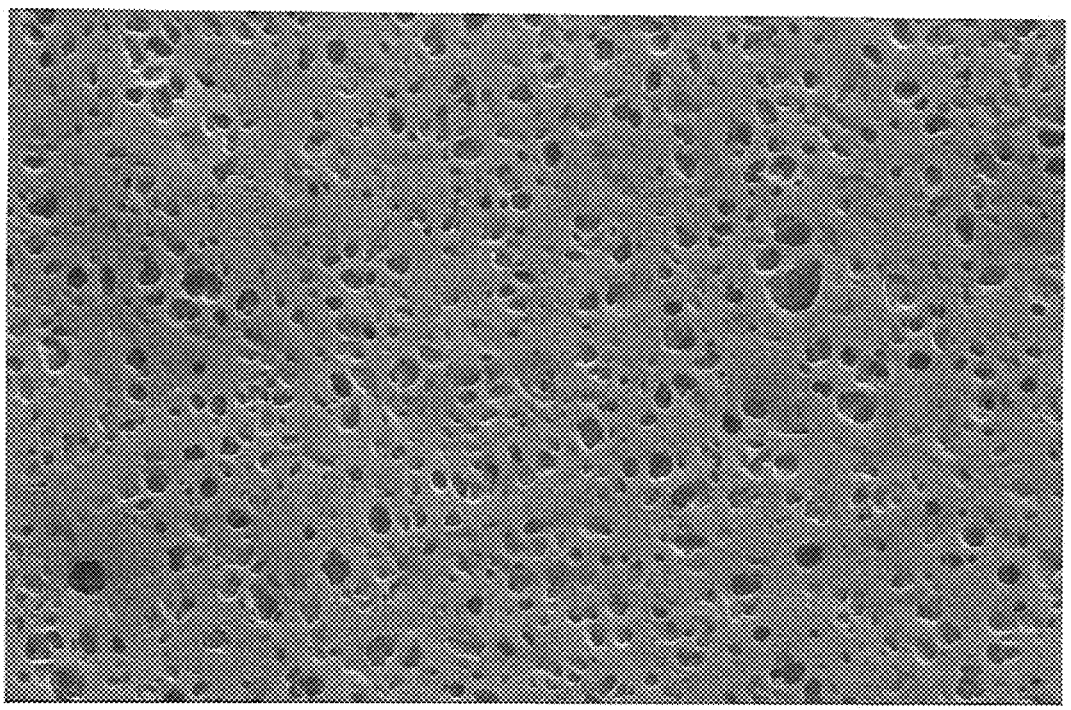
FIG. 9 depicts a scanning electron micrograph of Example 14.
Figure 10:
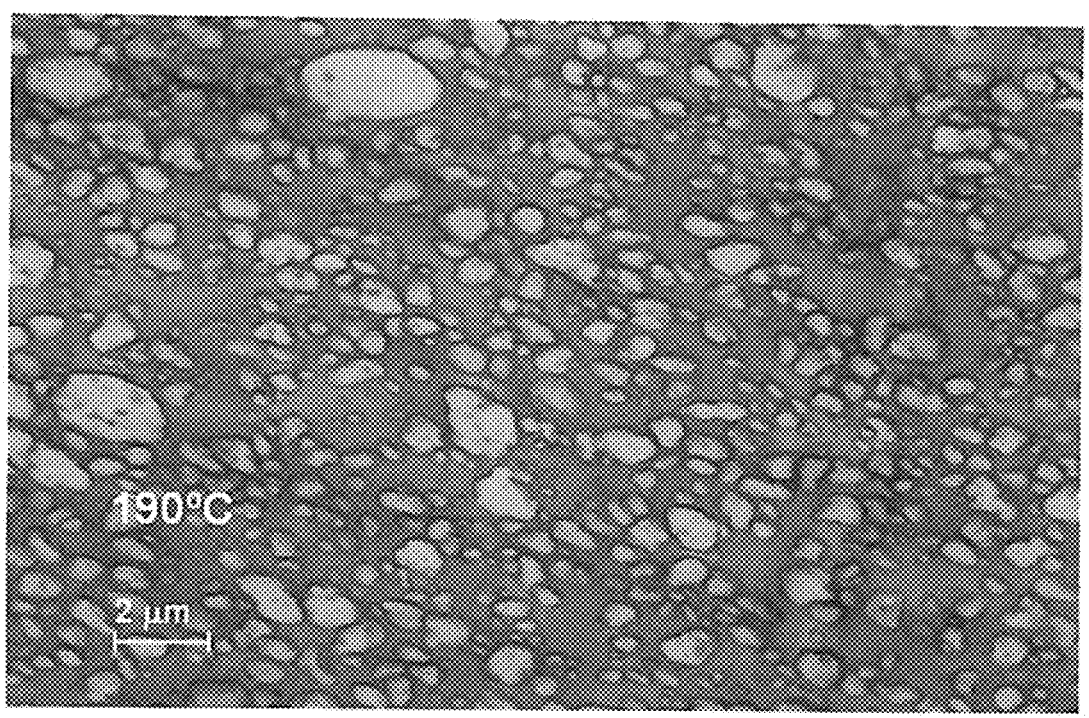
FIG. 10 depicts a scanning electron micrograph of Example 15.
Figure 11:
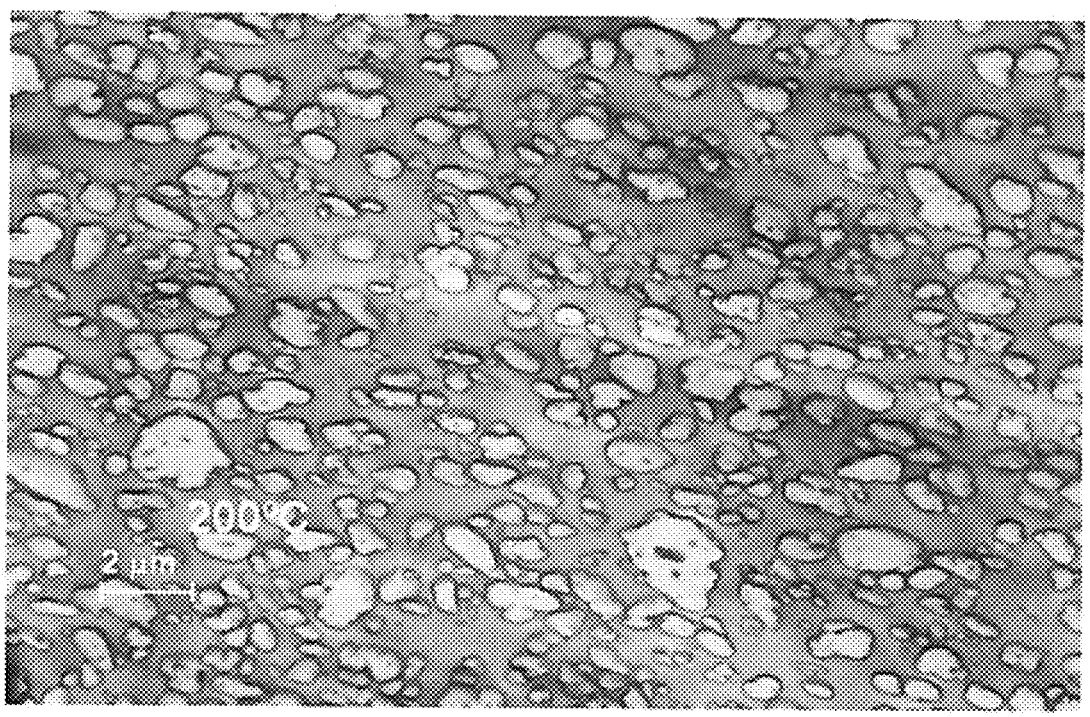
FIG. 11 depicts a scanning electron micrograph of Example 16.
Figure 12:
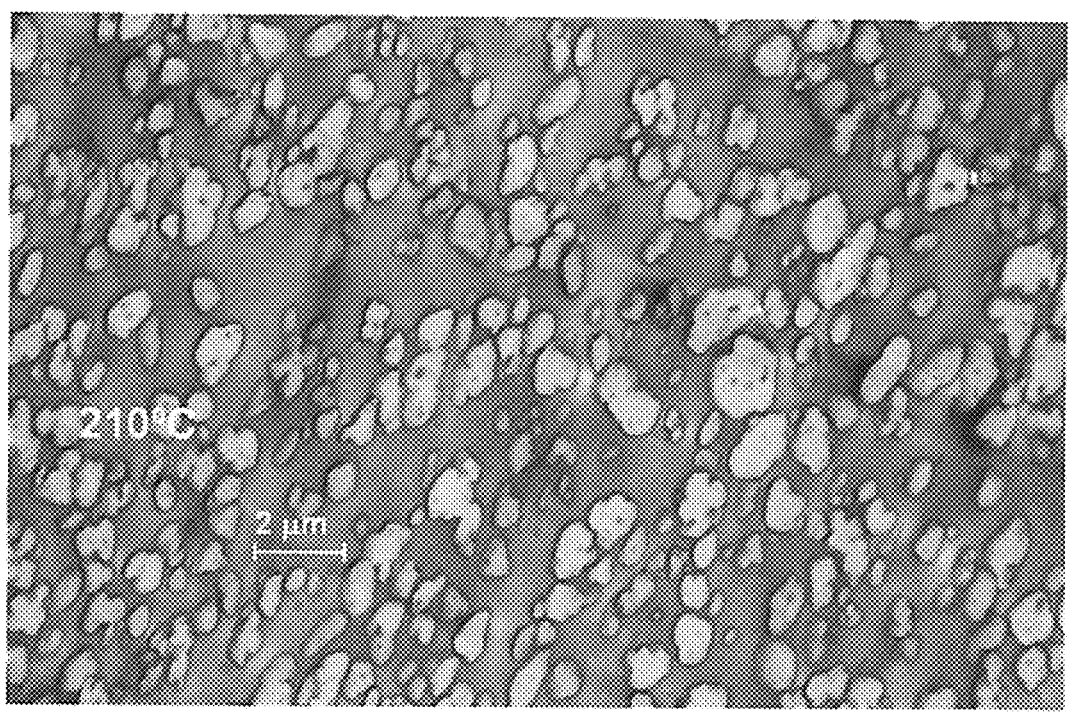
FIG. 12 depicts a scanning electron micrograph of 17.
Figure 13:
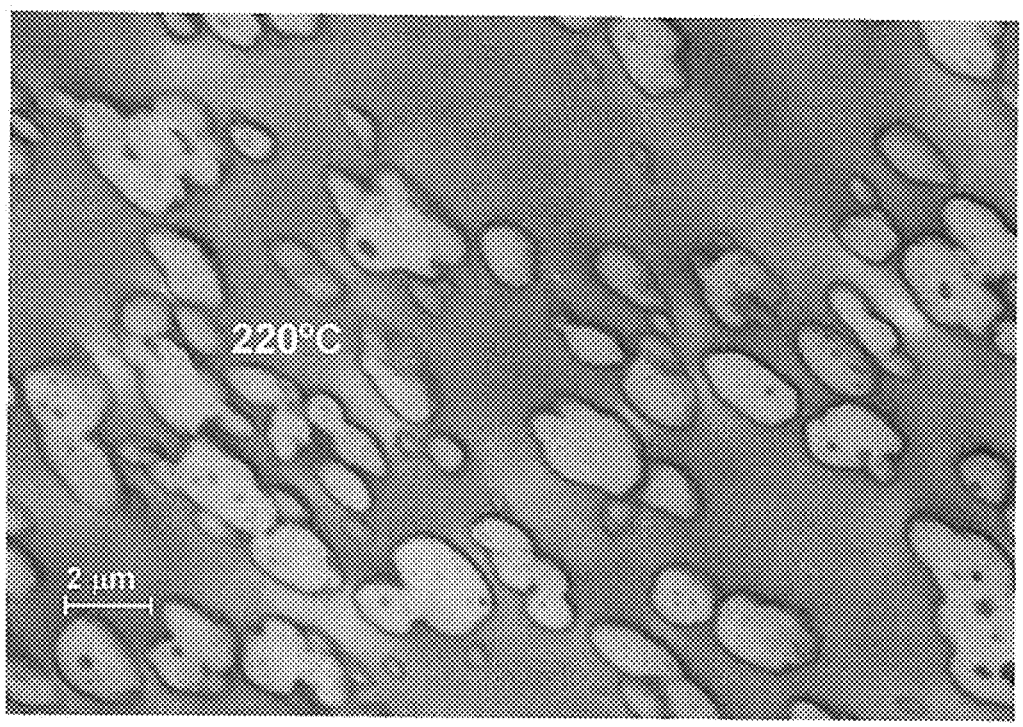
FIG. 13 depicts a scanning electron micrograph of Comparative Example C.
Figure 14:
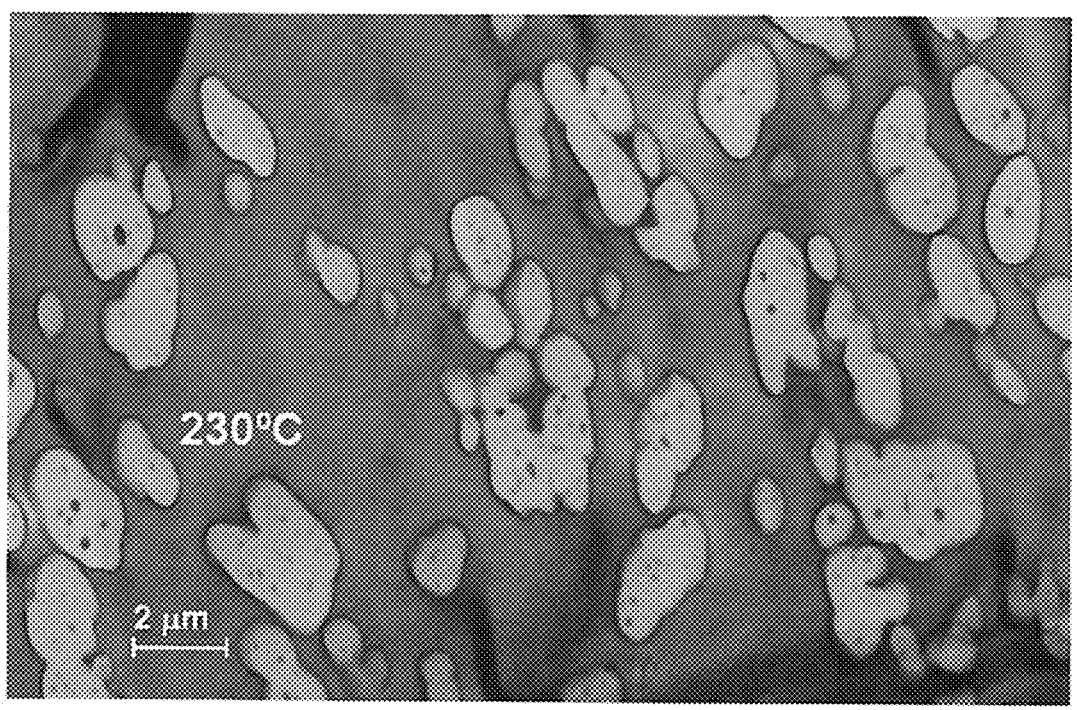
FIG. 14 depicts a scanning electron micrograph of Comparative Example D.
Figure 15:
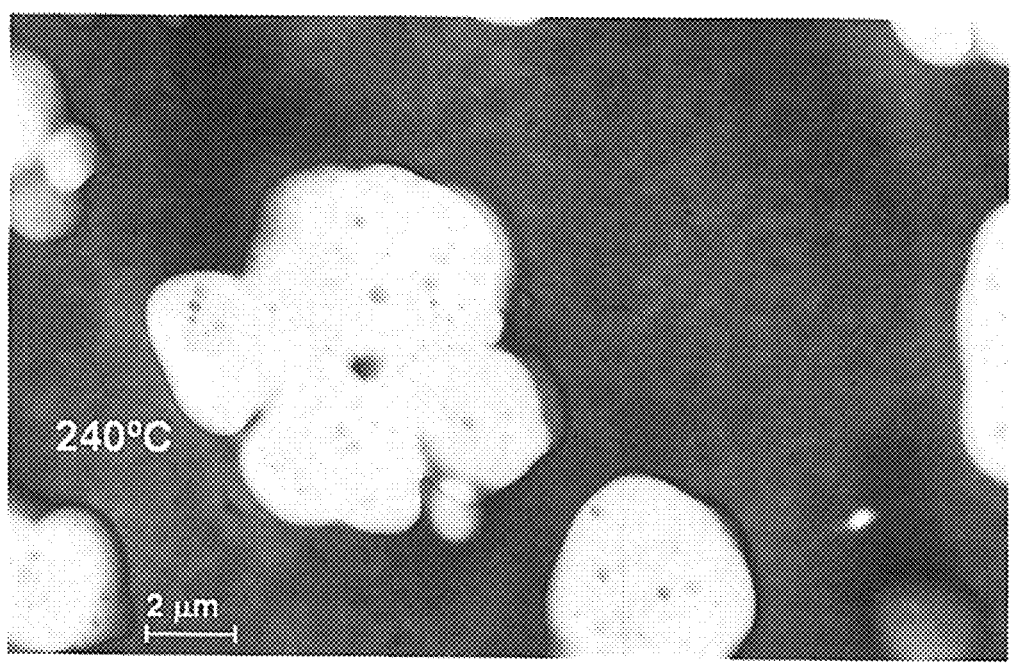
FIG. 15 depicts a scanning electron micrograph of Comparative Example E.
Figure 16:
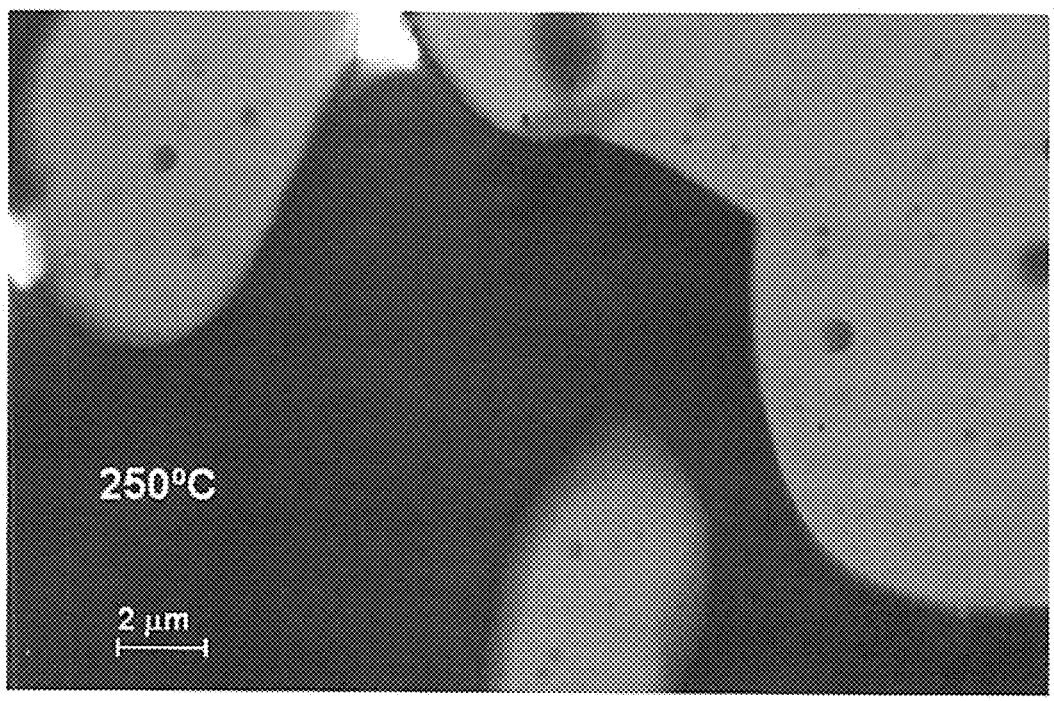
FIG. 16 depicts a scanning electron micrograph of Comparative Example F.

Modulus increased with increasing levels of micronized PPE. The storage modulus at elevated temperatures was determined by DMA and as depicted in FIGS. 1 and 2. In general, modulus values of polymers decrease with increasing temperature. Hence, it in certain end use situations it is desirable to maintaining high modulus above room temperature.

As indicated, previously, Dynamic Mechanical Analysis, otherwise known as DMA, is a technique which measures stiffness of a material as a function of temperature and is reported as modulus. DMA is also called DMTA for Dynamic Mechanical Thermal Analysis. The DMA procedure involves applying small deformation to a sample in a cyclic manner. This allows the materials to respond to stress, temperature, frequency and other values to be studied. Because the applied force is sinusoidal, the modulus can be expressed as an in-phase component, the storage modulus, and an out of phase component, the loss modulus.

Storage modulus, which is a measure of a sample's elastic behavior, was measured using a TA Instruments DMA Q800 V7.5 in flexural mode following the test method of ASTM D4440 where the temperature was increased at 4° C./minute and the frequency was 1 Hz. Storage modulus versus temperature data is depicted in FIGS. 1 and 2 and indicates that at a specific temperature, the storage modulus increased at increasing levels of micronized PPE.

TABLE 7A

Elastollan ™ C85 (TPU-1) and Micronized PPE

| | CEXA | EX1 | EX2 | EX3 | EX4 |
|---|---|---|---|---|---|
| Elastollan ™ C85 (TPU-1) | 100 | 90 | 80 | 70 | 60 |
| Micronized PPE (PPE-A) | 0 | 10 | 20 | 30 | 40 |
| Density, g/cc | 1.1850 | 1.1715 | 1.1597 | 1.1502 | 1.1398 |
| Hardness-Shore A | 87.9 | 89.1 | 91.5 | 93.7 | 95.42 |
| Hardness-Shore D | 38.5 | 42.04 | 45 | 46.6 | 51.12 |
| Tensile Stress at Yield, MPa | 9.5 | 13.3 | 16.6 | 18.2 | 14.8 |
| Tensile Stress at Break, MPa | 9.1 | 13.3 | 16.3 | 17.7 | 14.4 |
| Elongation at Yield, % | 637 | 626 | 620 | 530 | 324 |
| Elongation at Break, % | 637 | 632 | 630.4 | 617 | 390 |
| VICAT A, ° C. | 105 | 109.1 | 111.9 | 115.2 | 119.1 |
| Dielectric Constant @ 1 GHz | 3.885 | 3.693 | 3.375 | 3.244 | 3.112 |
| Loss Tangent @ 1 GHz | 0.0727 | 0.0632 | 0.0546 | 0.0478 | 0.0415 |
| Char in nitrogen at 600° C., wt % | 3.8 | 5.9 | 8.4 | 11.1 | 13.8 |
| Char in nitrogen at 700° C., wt % | 3.6 | 5.4 | 7.7 | 10.2 | 12.7 |
| Char in nitrogen at 800° C., wt % | 3.4 | 5.1 | 7.3 | 9.7 | 11.9 |
| Char in air at 600° C., wt % | 10.7 | 12.6 | 14.7 | 17.7 | 20.1 |
| Char in air at 700° C., wt % | 2.1 | 2.4 | 2.7 | 3 | 3.3 |
| Water absorption - 24 hrs/80° C., % | 1.56 | 1.43 | 1.32 | 1.2 | 1.09 |

TABLE 7B

Elastollan ™ 1185 (TPU-2) and Micronized PPE

| | CEXB | EX5 | EX6 | EX7 | EX8 |
|---|---|---|---|---|---|
| Elastollan ™ 1185 (TPU-2) | 100 | 90 | 80 | 70 | 60 |
| Micronized PPE (PPE-A) | 0 | 10 | 20 | 30 | 40 |
| Density, g/cc | 1.1169 | 1.1133 | 1.1087 | 1.1041 | 1.0996 |
| Hardness-Shore A | 87.8 | 90.2 | 91.9 | 94 | 95.8 |
| Hardness-Shore D | 39.2 | 43.1 | 46.8 | 48.8 | 52.8 |
| Tensile Stress at Yield, MPa | 11.7 | 15.2 | 19.3 | 21.9 | 21.4 |
| Tensile Stress at Break, MPa | 10.7 | 14.4 | 18.2 | 20.1 | 19.7 |
| Elongation at Yield, % | 620 | 590 | 613 | 630 | 365 |
| Elongation at Break, % | 625 | 590 | 613 | 633 | 450 |
| VICAT A, ° C. | 96.8 | 99.5 | 102.1 | 105.7 | 111.1 |
| Dielectric Constant @ 1 GHz | 3.698 | 3.497 | 3.311 | 3.149 | 3.012 |
| Loss Tangent @ 1 GHz | 0.0889 | 0.0782 | 0.0696 | 0.0596 | 0.0529 |
| Char in nitrogen at 600° C., wt % | 3.6 | 5.2 | 8.1 | 10.9 | 14.8 |
| Char in nitrogen at 700° C., wt % | 3.3 | 4.8 | 7.5 | 10.1 | 13.5 |
| Char in nitrogen at 800° C., wt % | 3.1 | 4.4 | 6.9 | 9.6 | 12.7 |
| Char in air at 600° C., wt % | 14.3 | 16.6 | 18.7 | 21.5 | 23.9 |
| Char in air at 700° C., wt % | 5.7 | 6.6 | 6.8 | 7.3 | 8.9 |
| Water absorption - 24 hrs/80° C., % | 1.77 | 1.624 | 1.484 | 1.355 | 1.226 |

Effect of PEE Particle Size

A description of the ultrafine PPE particles is provided in Table 1. Particle size and shape distribution was determined using the Camsizer® XT from Retsch Technology GmbH operating in air dispersion mode. The particle size is reported as a circular equivalent diameter. Where the 3-dimensional particle is imaged as 2-dimensional particle, the area of 2-dimensional image is converted to a circle with equal area, and the diameter of the circle measured. The aspect ratio is calculated by dividing the breath by the length of the 2-dimensional image.

Particle size measurements are calibrated using a certified NIST traceable highly precise (±0.1 microns) standard provided by Retsch Technology. The reference object is an electron beam lithographic pattern that simulates the entire measuring dynamic range of differently sized particles (1-3000 microns). The validation of particle size was carried out using a NIST traceable DRI-CAL particle size secondary standard. The standard is comprised of polystyrene/divinylbenzene polymeric beads (mean diameter; 23.2 microns±0.7 microns). The particle sizes used in the Examples are summarized in Table 1.

The blends that were tested are summarized in Table 8.

TABLE 8

| | Elastollan ™ 85 (TPU-1) wt % | PPE Type | PPE, wt % |
|---|---|---|---|
| EX3 | 70 | PPE-A | 30 |
| EX9 | 70 | PPE-B | 30 |
| EX10 | 70 | PPE-C | 30 |
| EX11 | 70 | PPE-D | 30 |
| EX12 | 70 | PPE-E | 30 |
| EX13 | 70 | PPE-F | 30 |
| EX14 | 70 | PPE-G | 10 |

Compositions were compounded on a Coperion ZSK 18 twin-screw laboratory (18 millimeter screw outer diameter) extruder operating at a screw rotation rate of 300 rotations per minute, a torque of 45-60%, and zone temperatures of 140° C., 150° C., 160° C., 170° C., 180° C., 180° C., and 180° C. from fee throat to die. Articles for physical property testing were injection molded using a Demag Plastic Group Model 40-80 injection molding machine operating at the zone temperatures of conditions of 199° C., 199° C., and 199° C.; Nozzle temperature of 205° C.; and mold temperature of 27° C. The injection pressure values were 2050 psi and back pressure values were 50.

A summary of the results for EX3 and EX9-14 appear in Table 9.

TABLE 9

|  | EX3 | EX9 | EX10 | EX11 | EX12 | EX13 | EX14 |
|---|---|---|---|---|---|---|---|
| Elastollan ™ C85 | 70 | 70 | 70 | 70 | 70 | 70 | 70 |
| Micronized PPE | 30 | 30 | 30 | 30 | 30 | 30 | 30 |
| Density, g/cc | 1.1502 | 1.1516 | 1.1518 | 1.1515 | 1.1513 | 1.1511 | 1.1512 |
| Hardness-Shore A | 93.7 | 93.6 | 94.1 | 93.6 | 94.3 | 93.34 | 94.1 |
| Hardness-Shore D | 46.6 | 45.9 | 43.7 | 45.3 | 43.3 | 42.5 | 43.2 |
| Modulus of elasticity, MPa | 630.4 | 405.8 | 407.3 | 417.8 | 404.5 | 405.8 | — |
| Tensile Stress at Yield, MPa | 18.2 | 15.3 | 15.3 | 15.9 | 16.0 | 15.9 | 16.1 |
| Tensile Stress at Break, MPa | 17.7 | 15.3 | 15.3 | 15.7 | 16.0 | 15.9 | 18.8 |
| Elongation at Yield, % | 530 | 402 | 406 | 408 | 404 | 404 | 408 |
| Elongation at Break, % | 617 | 406 | 412 | 412 | 404 | 404 | 408 |

EX3 exhibited higher tensile properties than EX9 through EX14. However, Examples EX3 and EX9 through EX14 all exhibited similar properties. There did not appear to be any differentiation of properties based on initial PPE particle size.

Scanning Electronic Microscopy (SEM) was used to assess the morphology of the PPE in Example 3, Ex9, Ex10, Ex11 Ex12, Ex13, and Ex14. The surfaces of microtomed samples were etched in toluene for 15 seconds. The PPE will be soluble in toluene, and therefore is expected to be removed from the surface giving a representation of the PPE domain size. The samples were examined using a Carl Zeiss AG-EVO® 40 Series scanning electron microscope. The conditions were SEM mode, a probe current of 40 picoamps, HV (high vacuum), and an acceleration voltage of 20 kilovolts. The images were all obtained at the same level of magnification of 3000×.

The images appear in FIGS. 3-9. There is very little differences in the size of the voids after PPE particles were extracted out with toluene. These results suggest that the larger PPE particles are being ground to smaller sizes during melt processing (extrusion and injection molding). That is, extrusion using a win screw extruder appears to be ginding the larger PPE particles to much smaller particles. The 6 micron PPE has better tensile properties than the materials prepared with the larger PPE particles.

Effect of Processing Temperature

The effect of processing temperature was evaluated using a Haaka mixing bowl.

The bowl was heated to 190° C. and 45 grams of Example 4 (60 wt % Elastollan™ C85 and 40 wt % micronized PPE) was placed in the bowl. After the resin softened the resin was mixed at 100 rpm (revolutions per minute). After 5 minutes a sample was taken. The temperature was increased 10° C., after 5 minutes at the new temperature a sample was taken. These steps were repeated until the temperature reached 250° C.

The morphology of the samples was investigated by scanning transmission electron microscopy. Microtomed surfaces were stained with ruthenium tetroxide and observed with a Zeiss EVO40 XVP scanning electron microscope with scanning transmission electron microscopy module. The samples tested are summarized in Table 10.

TABLE 10

|  | Processing Temperature, ° C. | Comments | STEM Figure |
|---|---|---|---|
| EX 15 | 190 | Small domian size | 10 |
| EX 16 | 200 | Small domian size | 11 |
| EX 17 | 210 | Small domian size | 12 |
| CEX C | 220 | Small increase in domian size | 13 |
| CEX D | 230 | Greater increase in domian size | 14 |
| CEX E | 240 | Large increase in domian size | 15 |
| CEX F | 250 | Huge increase in domian size | 16 |

Representative micrographs for Examples 15, 16, 17 and Comparative Examples C, D, E, and F are presented as FIGS. 10-16. respectively. The micrographs for Examples 15, 16, and 17 (FIGS. 10, 11, and 12) show similar, small PPE domain size. Comparative Example C and D (FIGS. 13 and 14) show a small increase in PPE domain size. Presumably the PPE particles are softening and coalescing. Comparative Example E and F (FIGS. 15 and 16) shows huge increases in PPE domain size.

Effect of Flame Retardant On Char Yield

Polymer degradation and combustion are complex processes. Various mechanistic studies have shown that combustion and fire retardance in polymeric materials are closely related to their degradation behavior. [C. F. Cullis, M. M. Hirschler, *The Combustion of Organic Polymers*, Clarendon Press, Oxford 1981] In the two-stage combustion model, there are two consecutive chemical processes—decomposition and combustion. Part of the combustion process also involves ignition and thermal feedback. Initially when the polymer is subjected to very high heat the polymer undergoes pyrolysis, which produces volatile low-molecular weight fragments. These volatile decomposition products undergo combustion in the vapor (gas) phase and generate heat. This heat of combustion in part is used to support the further decomposition.

In addition to combustible vapors that are formed during pyrolysis, a residue of pyrolysis can form in the condensed (solid) phase. This carbonaceous residue is referred to as char. Hence, a polymer that contains more groups with a high char-forming tendency will generate smaller amounts of combustible gases and the char can help to form a thermal barrier between the condensed phase and the flame. Indeed, Van Krevelen reported that increasing char yield could reduce the generation of combustible gases, limit the heat emitted by the pyrolysis reaction, decrease the solid's conductivity of heat, and thus reduce the flammability of materials. [D. W. Van Krevelen, *Polymer,* 16, 615 (1975)]

Samples were prepared by melt mixing the resin with flame retardants using a Haaka mixing howl. The mixing bowl was heated to 200° C. and 45.0 grams of plastic was added. After the temperature of the resins increased above the softening point of the resin, the rpm of the mixing blades was set at 100 rpm and the flame retardant was added. After mixing for 5 minutes a sample was taken for determination of char yield.

The flame retardant used in this study appear in the Table 11 below, along with the percent phosphorus (% P) and the percent nitrogen (% N) by weight of each flame retardant.

TABLE 11

| Chemical name | Supplier | Trademark and Grade | % P | % N |
|---|---|---|---|---|
| Ammonium polyphosphate | Clariant | Exolit AP422 | 31.0-32.0 | 14.0-15.0 |
| Melamine polyphosphate | Ciba/BASF | Melapur 200 | 13 | 43 |

To screen the effectiveness of FRs, previously prepared (via extrusion) samples were blended with either ammonium polyphosphate or melamine polyphosphate. For example, in Table 12, formulations of Examples 18, 19, 20, and 21 and Comparative Examples G, H, J, and K and examples were prepared using ammonium polyphosphate as the flame retardant. For example, Comparative Example G was prepared from 45 grams of the resin from Comparative Example A (See above) and 2.00 grams of ammonium polyphosphate. Likewise, Comparative Example H was prepared from 45 grams of the resin from Comparative Example A and 3.79 grams of ammonium polyphosphate. Example 18 was prepared from 45 grams of the resin from Example 4 and 2.00 grams of ammonium polyphosphate. Formulations Examples 22, 23, 24, and 25 and Comparative Examples M, N, P, and Q were prepared using melamine polyphosphate as the flame retardant appear below are summarized in Table 13.

TABLE 12

| | CEx A (g) | Ex4 (g) | CEx B (g) | Example 7 (g) | Ammonium polyphosphate (APP) | Wt % APP | % P |
|---|---|---|---|---|---|---|---|
| Comparative Example G | 45.0 | — | — | — | 2.00 | 4.26 | 1.32 |
| Comparative Example H | 45.0 | — | — | — | 3.79 | 7.76 | 2.41 |
| Example 18 | — | 45.0 | — | — | 2.00 | 4.26 | 1.32 |
| Example 19 | — | 45.0 | — | — | 3.82 | 7.76 | 2.42 |
| Comparative Example J | — | — | 45.0 | — | 2.00 | 4.26 | 1.32 |
| Comparative Example K | — | — | 45.0 | — | 3.71 | 7.76 | 2.36 |
| Example 20 | — | — | — | 45.0 | 2.00 | 4.26 | 1.32 |
| Example 21 | — | — | — | 45.0 | 3.61 | 7.76 | 2.30 |

TABLE 13

| | Comparative Example A | Example 4 | Comparative Example B | Example 7 | Melamine polyphosphate | Wt % MPP | % P |
|---|---|---|---|---|---|---|---|
| Comparative Example M | 45.0 | — | — | — | 4.00 | 8.16 | 1.06 |
| Comparative Example N | 45.0 | — | — | — | 7.74 | 7.76 | 1.91 |
| Example 22 | — | 45.0 | — | — | 4.00 | 8.16 | 1.06 |
| Example 23 | — | 45.0 | — | — | 7.64 | 7.82 | 1.89 |
| Comparative Example P | — | — | 45.0 | — | 4.00 | 8.16 | 1.32 |
| Comparative Example Q | — | — | 45.0 | — | 7.58 | 7.61 | 1.87 |
| Example 24 | — | — | — | 45.0 | 4.00 | 8.16 | 1.32 |
| Example 25 | — | — | — | 45.0 | 7.60 | 7.42 | 1.88 |

Thermogravimetric analysis (TGA) was used to measure char formation (char yield). The instrument was Perkin Elmer Pyris 1 TGA. Samples were evaluated in air and nitrogen and heated from 50 to 800° C. at 20° C./minute. Char at 600, 700, and 800° C. appears in Table FR.

The char yield for Comparative Examples A and B and Examples 4 and 7 which contain no flame retardant are compared with the char yield for materials with ammonium polyphosphate based formulations. Examples 18, 19, 20, 21 and Comparative Examples G, H, J, and K, in Table 14 below. Char yield was measured as weight percent of the material that did not volatilize according to the specified conditions. In each instance, char yield was increased, thus indicating a reduction in the production of volatile, combustible material. A decrease in fuel generation effectively lends itself to enhanced resistance to burning.

TABLE 14

| | Nitrogen 600° C. | Nitrogen 700° C. | Nitrogen 800° C. | Air 600° C. | Air 700° C. | Air 800° C. |
|---|---|---|---|---|---|---|
| Comparative Example A | 3.8 | 3.6 | 3.4 | 10.7 | 2.1 | ~0 |
| Comparative Example G | 19.02 | 18.43 | 17.5 | 24.65 | 16.54 | 7.45 |
| Comparative Example H | 22.56 | 21.9 | 20.7 | 26.7 | 20.22 | 9.11 |
| Example 4 | 13.8 | 12.7 | 11.9 | 20.1 | 3.3 | — |
| Example 18 | 27.76 | 26.34 | 25.33 | 29.11 | 22.94 | 15.07 |
| Example 19 | 28.25 | 27.26 | 26.24 | 30.39 | 25.25 | 16.12 |
| Comparative Example B | 3.6 | 3.3 | 3.1 | 14.3 | 5.7 | ~0 |
| Comparative Example J | 6.83 | 6.66 | 6.36 | 15.7 | 9.79 | 4.44 |
| Comparative Example K | 9.72 | 9.49 | 9.12 | 19.66 | 15.24 | 7.64 |
| Example 7 | 10.9 | 10.1 | 9.6 | 21.5 | 7.3 | — |
| Example 20 | 16.19 | 15.18 | 14.36 | 23.94 | 16.62 | 9.77 |
| Example 21 | 18.79 | 18.29 | 17.28 | 25.74 | 19.33 | 11.57 |

The char yield for Comparative Examples A and B and Examples 4 and 7, none of which contain flame retardant, are compared with the char yield (or materials with melamine polyphosphate based formulations. Examples 22, 23, 24, and 25 and Comparative Examples M, N, P, and Q, in Table 15 below. Char yield was measured as weight percent of the material that did not volatilize according to the specified conditions. In each instance, char yield was increased, thus indicating a reduction in the flammability of the materials.

TABLE 15

| | Nitrogen 600° C. | Nitrogen 700° C. | Nitrogen 800° C. | Air 600° C. | Air 700° C. | Air 800° C. |
|---|---|---|---|---|---|---|
| Comparative Example A | 3.8 | 3.6 | 3.4 | 10.7 | 2.1 | — |
| Comparative Example M | 16.47 | 15.94 | 15.32 | 19.82 | 13.18 | 4.72 |
| Comparative Example N | 16.58 | 16.05 | 15.56 | 21.96 | 16.38 | 7.21 |
| Example 4 | 13.8 | 12.7 | 11.9 | 20.1 | 3.3 | — |
| Example 22 | 22.93 | 21.66 | 20.91 | 25.77 | 21.24 | 14.28 |
| Example 23 | 23.8 | 22.35 | 21.41 | 25.89 | 18.45 | 9.85 |
| Comparative Example B | 3.6 | 3.3 | 3.1 | 14.3 | 5.7 | ~0 |
| Comparative Example P | 6.75 | 6.56 | 6.32 | 16.61 | 7.78 | ~0 |
| Comparative Example Q | 10.43 | 9.93 | 9.17 | 18.2 | 10 | ~0 |
| Example 7 | 10.9 | 10.1 | 9.6 | 21.5 | 7.3 | ~0 |
| Example 24 | 16.15 | 15.19 | 14.55 | 22.05 | 15.3 | 8.69 |
| Example 25 | 16.38 | 15.52 | 14.84 | 21.24 | 15.08 | 8.76 |

The data in Tables 15 and 16 indicate a substantial increase in char in compositions comprising thermoplastic polyurethane, micronized PPE, and either ammonium polyphosphate or melamine polyphosphate as the flame retardant effectively reducing the flammability of materials.

Processing Window

The effect of processing temperature was evaluated using a Haaka mixing bowl.

The bowl was heated to 190° C. and 45 grams of Example 4 (60 wt % Elastollan™ C85 and 40 wt % micronized PPE) was placed in the bowl. After the resin softened the resin was mixed at 100 rpm (revolutions per minute). After 5 minutes a sample was taken. The temperature was increased 10° C., after 5 minutes at the new temperature a sample was taken. These steps were repeated until the temperature reached 250° C.

Figure 17:
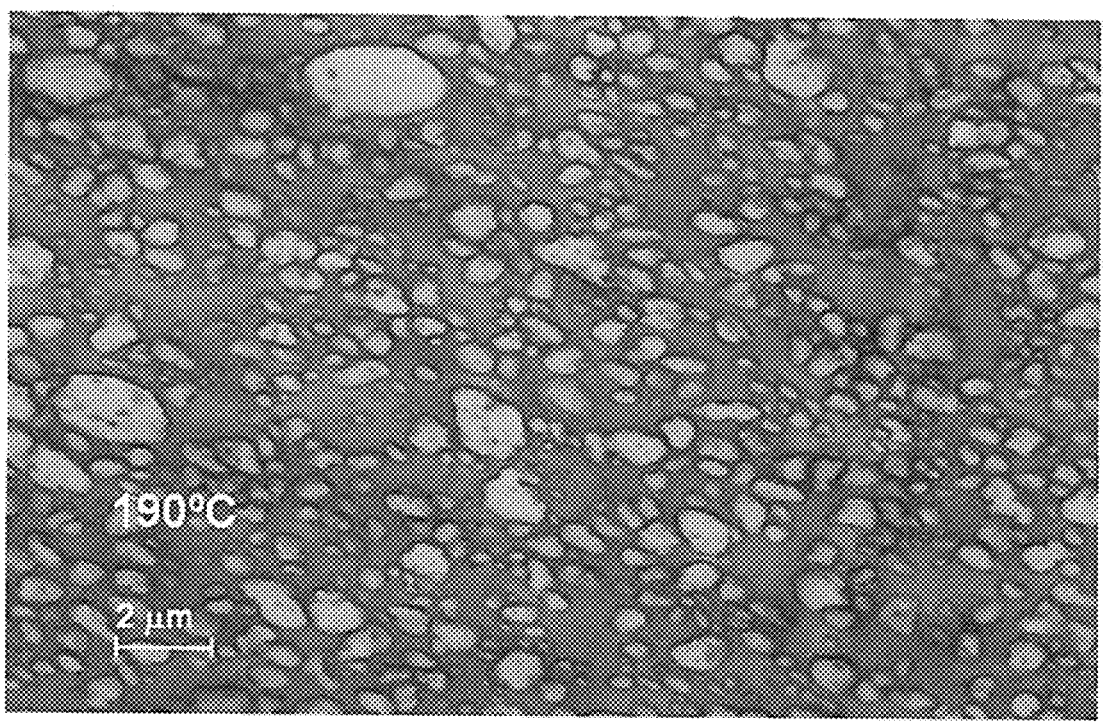
FIG. 17 depicts a scanning transmission electron micrograph of Example 26.
Figure 18:
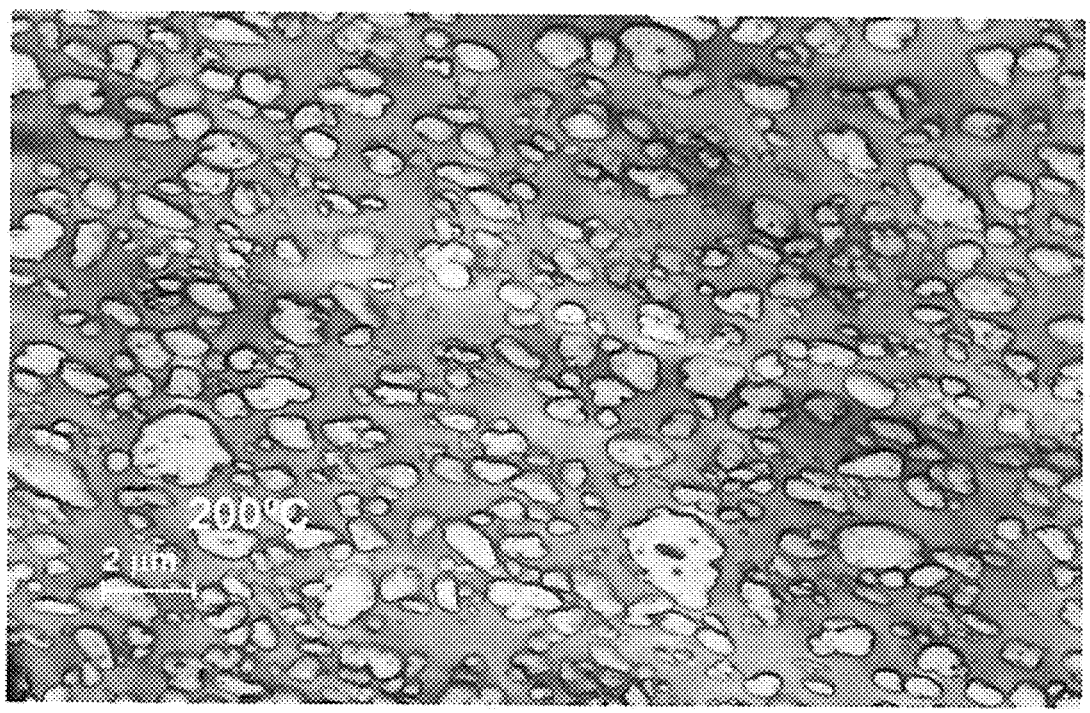
FIG. 18 depicts a scanning transmission electron micrograph of Example 27.
Figure 19:
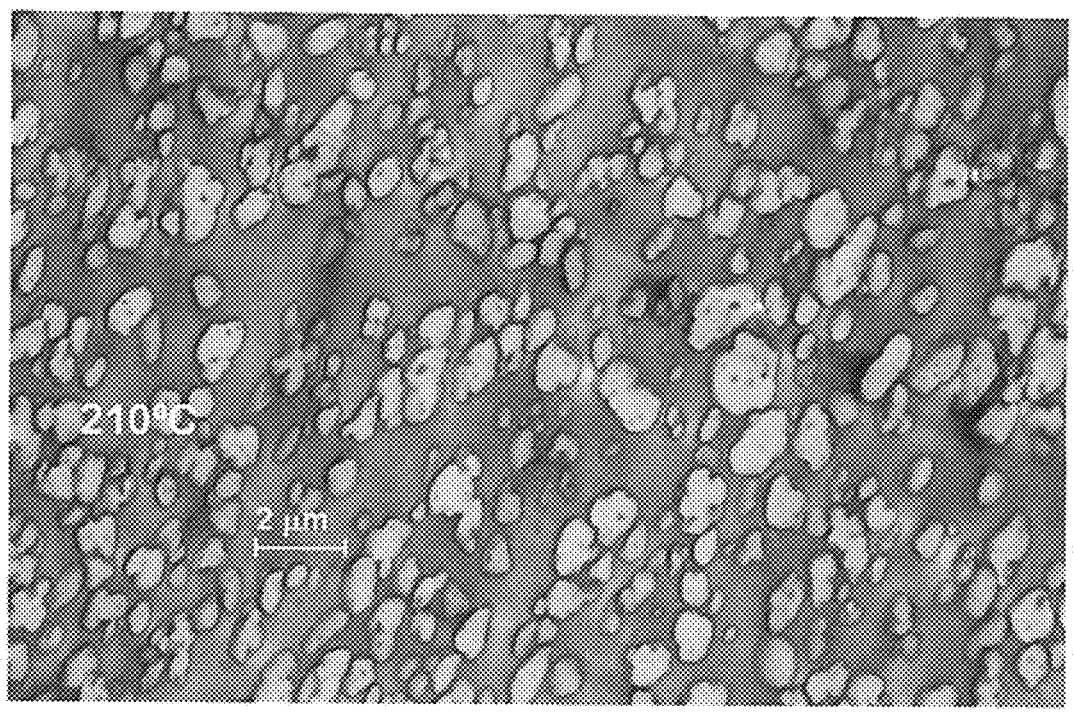
FIG. 19 depicts a scanning transmission electron micrograph of Example 28.
Figure 20:
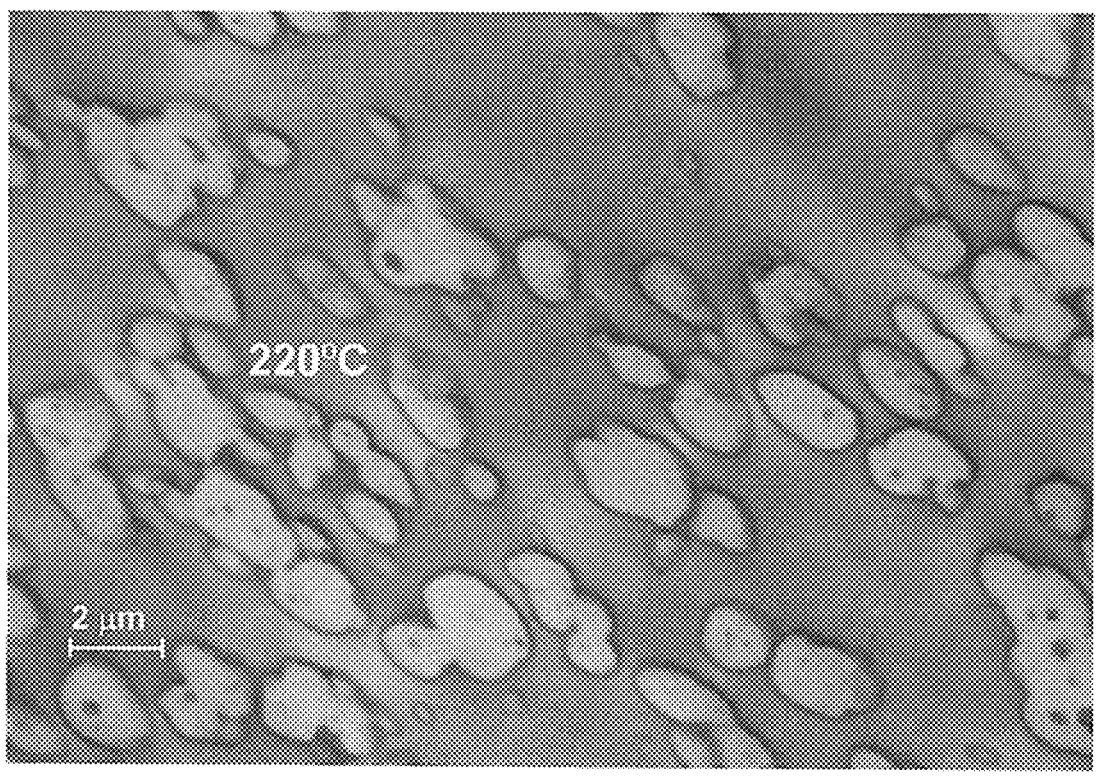
FIG. 20 depicts a scanning transmission electron micrograph of Comparative Example R.
Figure 21:
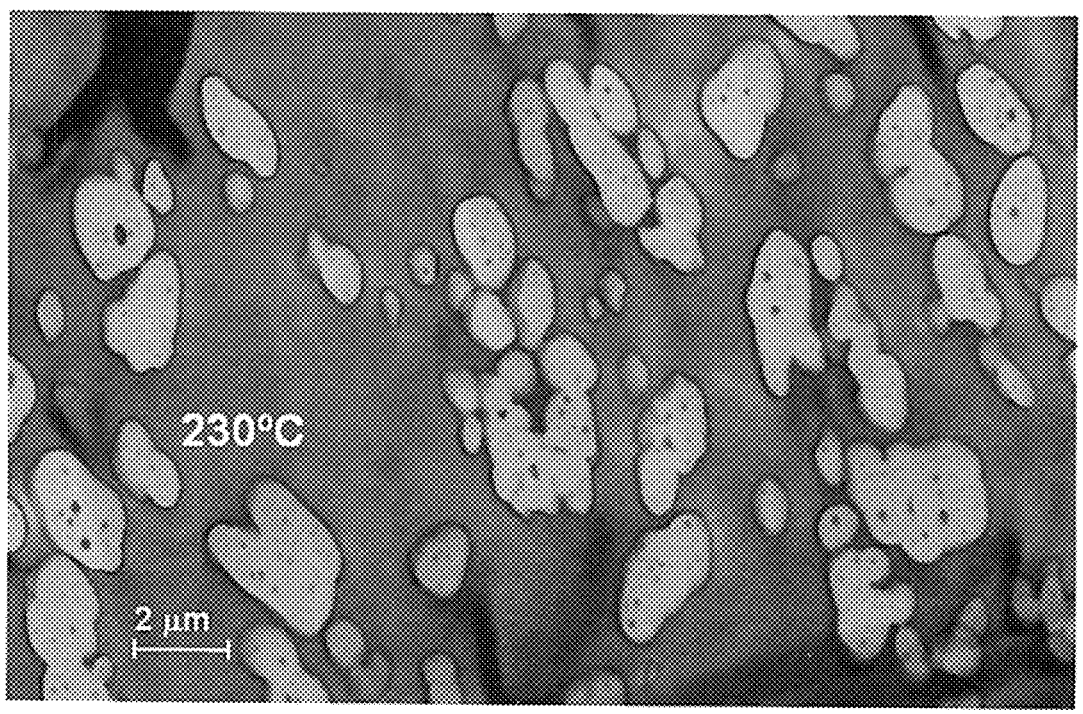
FIG. 21 depicts a scanning transmission electron micrograph of Comparative Example S.
Figure 22:
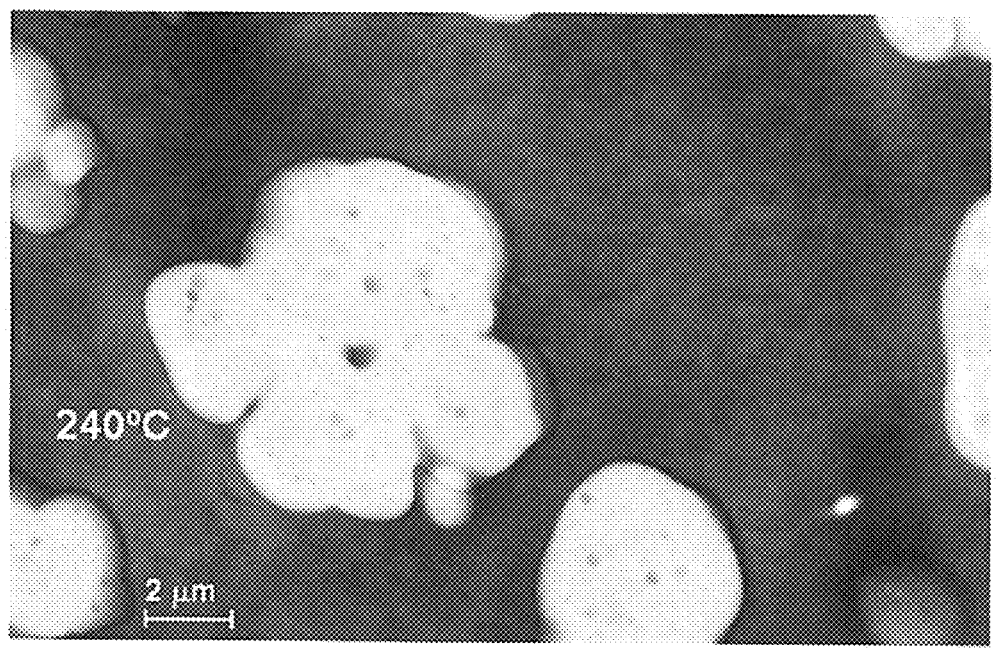
FIG. 22 depicts a scanning transmission electron micrograph of Comparative Example T.
Figure 23:
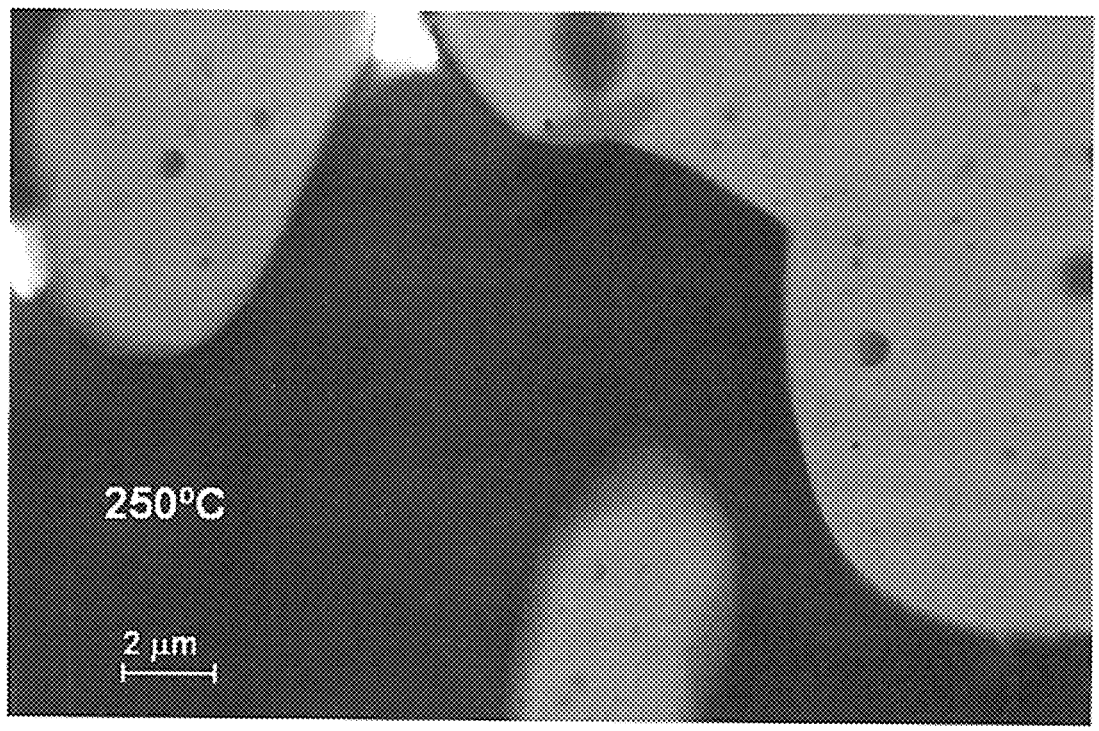
FIG. 23 depicts a scanning transmission electron micrograph of Comparative Example V.

The morphology of the samples was investigated by scanning transmission electron microscopy. Microtomed surfaces were stained with ruthenium tetroxide and observed with a Zeiss EVO40 XVP scanning electron microscope with scanning transmission electron microscopy module. The results are summarized in Table 16. Representative micrographs for Examples 26, 27, 28 and Comparative Example R, S, T, and V are presented as FIGS. 17-22, respectively. The micrographs for Examples 26, 27, and 28 (FIGS. 17, 18, and 19) show similar, small PPE domain size. Comparative Examples R and S (FIGS. 20 and 21) show a small increase in PPE domain size. Presumably the PPE particles are softening and coalescing. Comparative Example T and V (FIGS. 22 and 23) show huge increases in PPE domain size.

TABLE 16

| | Processing Temperate, ° C. | Comments | STEM Figure |
|---|---|---|---|
| Example 26 | 190 | Small domain size | 1 |
| Example 27 | 200 | Small domain size | 2 |
| Example 28 | 210 | Small domain size | 3 |
| Comparative Example R | 220 | Small increase in domain size | 4 |
| Comparative Example S | 230 | Greater increase in domain size | 5 |
| Comparative Example T | 240 | Large increase in domain size | 6 |
| Comparative Example V | 250 | Huge increase in domain size | 7 |

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:
1. A. blend comprising:
   (a) 5 to 50 percent by weight of the micronized poly(phenylene ether), wherein the mean particle size of the poly(phenylene ether) is 9 microns or less;
   (b) 50 to 95 percent by weight of a thermoplastic polyurethane;
   wherein the weight percents are based on the total weight of the blend.
2. The blend of claim 1, wherein the poly(phenylene ether) is poly(2,6-dimethyl-1,4-phenylene ether) having an intrinsic viscosity of between 0.30 deciliters to 1.5 deciliters per gram, measured in chloroform at 25° C.
3. The blend of claim 1, comprising ultrafine particles of the micronized poly(phenylene ether) having a mean particle size of 3.8 microns to 8.4 microns.
4. The blend of claim 1, comprising ultrafine particles of the micronized poly(phenylene ether) of having a mean particle size of 6 microns.
5. The blend of claim 1, comprising ultrafine particles of micronized poly(phenylene ether), wherein 90 percent of the particle volume distribution of the ultrafine particulate poly(phenylene ether) is below 8 microns.
6. The blend of claim 1, comprising ultrafine particles of micronized poly(phenylene ether), wherein 90 percent of the particle volume distribution of the ultrafine particulate poly(phenylene ether) is below 775 microns.
7. The blend of claim 1, wherein the thermoplastic polyurethane is the reaction product of a polyether diol, diisocyanate, and a chain extender.
8. The blend of claim 1, wherein the thermoplastic polyurethane is the reaction product of a polyester diol, diisocyanate, and a chain extender.
9. The diisocyanate of claim 7 or 8, wherein the diisocyanate is methylenebis(phenyl isocyanate) or variants.
10. The polyether diol in claim 7 is poly(oxytetramethylene).
11. The poly(oxytetramethylene) is α-Hydro-ω-hydroxy-poly(oxy-1,4-butanediyl).
12. The polyester diol in claim 8 is polycaprolactone diol.
13. A process for preparing a blend comprising:
   (a) 5 to 50 percent by weight of the ultrafine particulate poly(phenylene ether), wherein the mean particle size of the poly(phenylene ether) is 6 to 40 microns;
   (b) 50 to 95 percent by weight of a thermoplastic polyurethane; comprising the steps of:
      (i) blending the poly(phenylene ether) into the thermoplastic polyurethane at a temperature that is lower than the glass transition temperature of the poly(phenylene ether).
14. A blend comprising:
   (a) 10 to 40 percent by weight of the ultrafine particulate poly(phenylene ether), wherein the mean particle size of the poly(phenylene ether) is 9 microns or less;
   (b) 60 to 90 percent by weight of a thermoplastic polyurethane;
   (c) 3 to 20 weight percent of a phosphorus-containing flame retardant, based on the total weight of the composition
   wherein the weight percents are based on the total weight of the blend.
15. A blend comprising:
   (a) (a) 10 to 40 percent by weight of the ultrafine particulate poly(phenylene ether), wherein the mean particle size of the poly(phenylene ether) is 9 microns or less;
   (b) 60 to 90 percent by weight of a thermoplastic polyurethane;
   (c) a phosphorus-containing flame retardant wherein the amount of phosphorus in the flame retardant is 0.8 to 3 weight percent based on the total weight of the composition.
16. The blend of claim 14 or claim 15, wherein the phosphorus-containing flame retardant is ammonium polyphosphate or melamine polyphosphate or a mixture thereof.
17. An article comprising the blend of claim 1.

* * * * *